United States Patent [19]

Hasegawa et al.

[11] Patent Number: 4,956,664
[45] Date of Patent: Sep. 11, 1990

[54] IMAGE PROCESSING APPARATUS HAVING AN OVERHEAD PROJECTOR

[75] Inventors: Takanori Hasegawa, Hachioji; Nobuyuki Abe, Toride; Toshihiko Hirose, Yamanashi; Takashi Kanda, Kofu; Hiroshi Saito, Yamanashi; Eiji Nakazawa, Nirasaki; Masaki Oshima, Yamanashi, all of Japan

[73] Assignees: Riso Kagaku Corporation, Tokyo; Nippon Seimitsu Kogyo Kabushiki Kaisha, Kof, both of Japan

[21] Appl. No.: 351,742

[22] Filed: May 15, 1989

[30] Foreign Application Priority Data

| May 17, 1988 | [JP] | Japan | 63-120172 |
| May 17, 1988 | [JP] | Japan | 63-120173 |
| May 17, 1988 | [JP] | Japan | 63-120174 |
| May 17, 1988 | [JP] | Japan | 63-120175 |
| May 17, 1988 | [JP] | Japan | 63-120176 |
| May 17, 1988 | [JP] | Japan | 63-120177 |

[51] Int. Cl.$^5$ .............................................. G03B 27/52
[52] U.S. Cl. ...................................... 355/43; 355/44; 355/45
[58] Field of Search ...................... 355/43–45, 355/202; 353/23, 24, 66, 121, 122; 358/296, 298, 300.2

[56] References Cited

U.S. PATENT DOCUMENTS

| 4,636,062 | 1/1987 | Ohno et al. | 355/43 |
| 4,811,110 | 3/1989 | Ohmura et al. | 358/296 X |

Primary Examiner—Michael L. Gellner
Assistant Examiner—D. Rutledge
Attorney, Agent, or Firm—Kanesaka and Takeuchi

[57] ABSTRACT

An image processing apparatus comprising: an input unit for inputting an image of an initial original; a support table on which the initial original is to be set, the support table being movably mounted along the input unit; a reflection-type focusing plate on which an OHP (overhead projector) original is to be set, the focusing plate being disposed along side the input unit; an image forming unit disposed under the focusing plate for forming on a sheet an image inputted from the input unit to provide an OHP original; and a projecting unit disposed above the focusing plate for projecting an image of the OHP original set on focusing plate.

14 Claims, 29 Drawing Sheets

FIG. II(A)
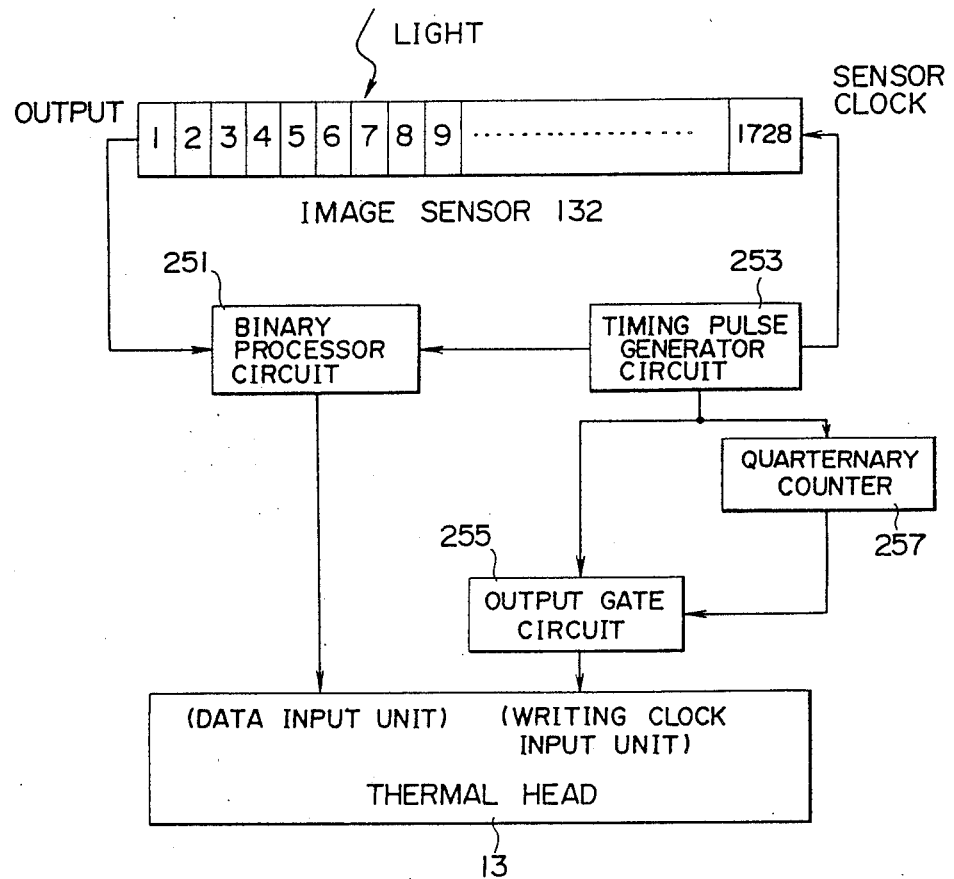

FIG. II(E)
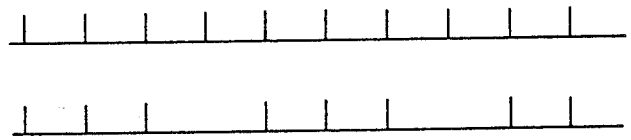
FIG. II(F)
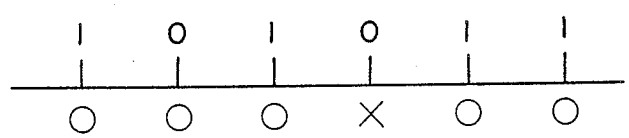
FIG. II(G)
| 1 2 3 4 5 6 7 8 9 | | | | | | | | | 1296 | | 1728 |
|---|---|---|---|---|---|---|---|---|---|---|---|
| 1 | 2 | 3 | 5 | 6 | 7 | 9 | 10 | 11 | ······ | 1727 | BLANK |
NOTE: EACH FIGURE IN FRAME STANDS FOR
THE NUMBER OF A PHOTOELECTRIC
ELEMENT IN IMAGE SENSOR.

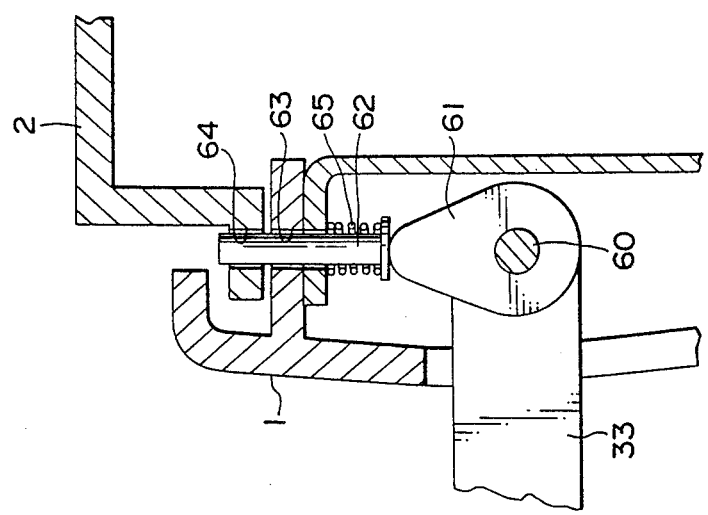
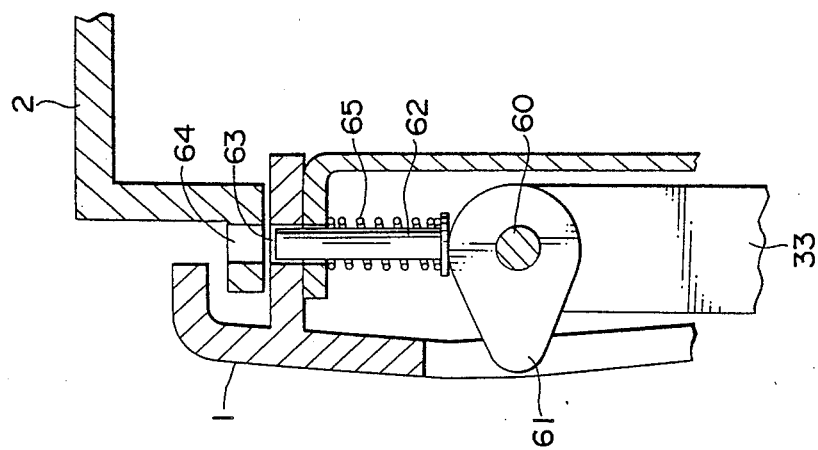

F I G. 27
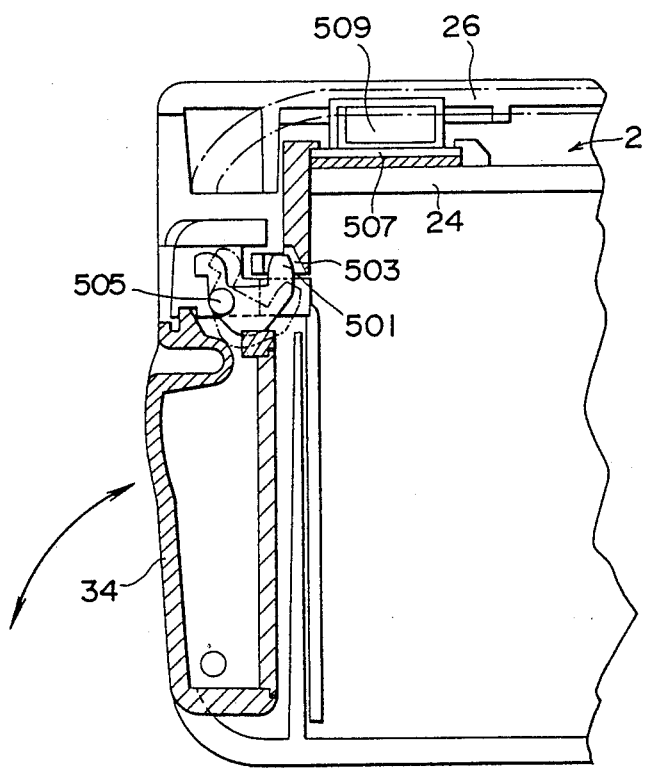

IMAGE PROCESSING APPARATUS HAVING AN OVERHEAD PROJECTOR

BACKGROUND OF THE INVENTION

1. Field of the Invention:

The present invention relates to an image processing apparatus having a function of projecting an image of an original on a screen, like an overhead projector, and a function of forming an image of the original on a paper or a transparent sheet, like a copying machine.

2. Description of the Related Art:

Conventional overhead projectors (hereinafter called "OHP") can be divided into two groups: transparence-type; and reflection-type.

In the transparence-type OHP, an original placed on a transparent support table is illuminated from the underside of the support table, and an image of the original is projected on a screen via a projector lens and a reflector mirror, both disposed above the support table.

In the reflection-type OHP, an original on a fresnel lens is illuminated from the upperside of the fresnel lens and a reflected image of the original is projected on the screen via a projector lens and a reflector mirror, both disposed above the fresnel lens.

Apart from a simple original that can be formed by manually drawing or writing a figure or a character directly on a transparent sheet with a pen, an ordinary original to be used in the OHP is formed by copying an image on a transparent sheet by using an electrophotographic copying machine, for example.

When giving a lecture, a presentation or a briefing by using an OHP at a school, a presentation site or a meeting room, it is necessary to prepare an OHP original in advance. Therefore, if there is no original, an unscheduled material readily be projected on the screen, though an original may be prepared by copying To this end, a solution has been proposed in which an OHP is combined with a copying machine, as illustrated in FIGS. 16 and 17 of the accompanying drawings, so that an original to be projected can be readily prepared by the copying machine. The prior art apparatus of FIG. 16 is a reflection type which comprises an original cover 203 openably mounted on an apparatus body 201, a reflection-type focusing plate 205, such as a fresnel lens, disposed on an upper surface of the original cover 203, and a projecting unit 207 disposed above the focusing plate 205. The prior art apparatus of FIG. 17 is a transparence type which comprises a support table 202 movably mounted on an apparatus body 201; when projecting, the support table 202 is moved away from a focusing plate 205 disposed on the top of the body 201, and the original on the focusing plate 205 is illuminated to a projecting unit 207 by a lamp 209 disposed below the focusing plate 205.

A problem with the reflection-type apparatus is that since the focusing plate 205 is disposed on the upper surface of the original cover 203, proper projection can not be made if the positional relationship of the lamp, the focusing plate, the projecting lens and the reflector mirror is not proper. The above relationship is regarded as one of the most significant factors in the reflection-type optical system. In this optical system, if the support cover 203 is shifted out of parallel relationship to the focusing plate 205, the center line of reflected and focused rays of light changes due to the shifted focusing plate is, thus causing a distorted image on the screen. Since this conventional apparatus requires additional means and space in order to eliminate the prior problem, it is impossible to make the apparatus light in weight and compact in size.

A problem with the transparence-type apparatus is that since the lamp is disposed within the body, the interior of the body would be heated by the lamp to a high temperature, which is very influential on various peripheral parts. Further, it is impossible to accomodate a roll of heat-sensitive paper in the interior of the body.

Another problem with the conventional apparatus is that since the support table is moved with the projecting unit and is supported over the focusing plate, the projecting unit would be a substantial obstacle while the original is being set on the support table or is being replaced with a new one. Yet if the projecting unit is merely folded over the body, then the support table cannot be moved without difficulties.

Further, since an OHF original is formed on an OHP sheet on a size equal to the size of the initial original, a setting surface of the reflection-type focusing plate requires a size substantially equal to that of the OHP original. Consequently it is impossible to reduce the apparatus to an adequately compact size.

Yet if the distance between the projecting unit 207 and the focusing plate 205 is reduced in order to provide a compact apparatus, the distance between the focusing lens 205 and the projecting lens 210 also necessarily varies, as shown in FIG. 22, thus requiring a wide-angle projecting lens. With such wide-angle projecting lens, a projected image would be irregular in darkness with marginal portions darker than the central portion.

A further problem with the conventional apparatus is that since in order to perform the copying operation when the lamp is on, the power source must be the sum of the consumed electric power of the lamp and the consumed electric power for copying, it is expensive to operate the apparatus.

If two separate power sources are used for the lamp and the copying, respectively, it is impossible to reduce the entire apparatus in weight, size and cost.

When the lamp is on, the lens surface of the focusing plate is high in temperature. Therefore it is very risky to perform copying operation while the lamp is on. This also gives an adverse influence on the temperature control of the thermal head.

With the conventional apparatus in which the support table is moved by a motor, since the power source is off and the support table is not locked while the apparatus is being carried, the support table tends to move due to the swinging motion of the apparatus being carried. As a result, the support table tends to contact the peripheral parts.

SUMMARY OF THE INVENTION

It is therefore an object of the present invention to provide an image processing apparatus in which a reflection-type focusing plate and a projecting unit are free from any mutual displacement and in which an image forming unit can be prevented from being influenced by the heat of a projecting unit.

Another object of the invention is to provide an image processing apparatus in which a projecting unit can be accomodated so as not to interfere with the handling of an original for setting or replacement.

Still another object of the invention is to provide an image processing apparatus which can be reduced to a compact size and in which a projected image free from difference in darkness between the marginal and central portions can be formed on the screen.

A further object of the invention is to provide an image processing apparatus in which copying operation and projecting operation can be prevented from being done concurrently, thus causing a reduced amount of cost and, at the same time, securing safety.

A still further object of the invention is to provide an image processing apparatus in which the support table can be locked or released with ease.

According to the present invention, an image processing apparatus comprises an input unit for inputting an image of an initial original, a support table which is movable along the input unit and on which the original is to be placed, a reflection-type focusing plate which is disposed in parallel to the input unit and on which the original to be projected is to be set, an image forming unit disposed under the reflection-type focusing plate for forming on a sheet the image inputted from the input unit to provide an OHP original, and a projecting unit disposed over the reflection-type focusing plate for projecting the image of the OHP original set on the reflection-type focusing plate. Further, the image forming unit includes a sheet supply unit from which a sheet is to be supplied by hand, and a roll-paper setting unit.

Many other advantages, features and additional objects of the present invention will be manifest to those versed in the art upon making reference to the following detailed description and the accompanying drawings in which a structural embodiment incorporating the principles of the present invention is shown by way of illustrative example.

BRIEF DESCRIPTION OF THE DRAWINGS

FIGS. 13(A) and 13(B) are cross-sectional views of a support-table locking mechanism which is actuatable by a FIGS. 14(A) through 14(D) are flow charts of various operations of the apparatus;

FIGS. 26 through 28 illustrate a fourth embodiment; and FIGS. 28 through 34 illustrate a fifth embodiment.

DETAILED DESCRIPTION

Figure 1:
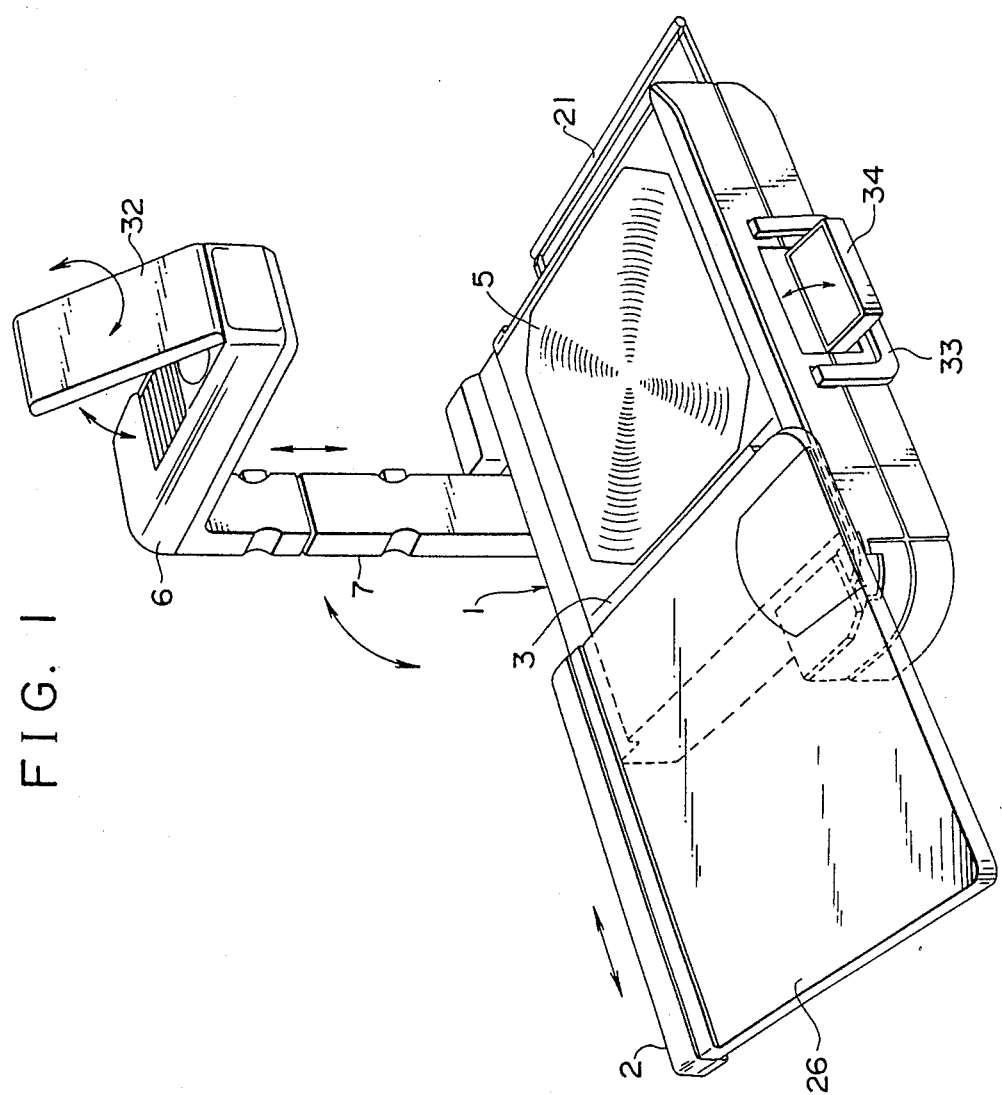
FIG. 1 is a perspective view of an image processing apparatus embodying the present invention, showing the apparatus as it is used as OHP.

The principles of the present invention are particularly useful when embodied in an image processing apparatus (hereinafter called "apparatus") such as shown in FIGS. 1 through 4.

As shown in FIGS. 1 through 7, the apparatus generally comprises a body 1 having a function of forming an original such as by copying, a support table 2 movably mounted on the top of the body 1, and an image input unit for inputting an image of an original, e.g. a read-out unit 3 mounted on the upper surface of the body 1 for scanning the original on the support table 2. Designated by 4 is an image forming mechanism, e.g. a printing mechanism, mounted in the body 1.

The apparatus also comprises a reflection-type focusing plate 5 mounted on the upper surface of the body 1 in parallel to the read-out unit 3, and a projecting unit 6 secured to the side of the body 1 and supported over the focusing plate 5.

The image forming function, e.g., the copying function, of the body 1 is performed jointly by the support table 2, the read-out unit 3 and the printing mechanism 4.

Figure 3:
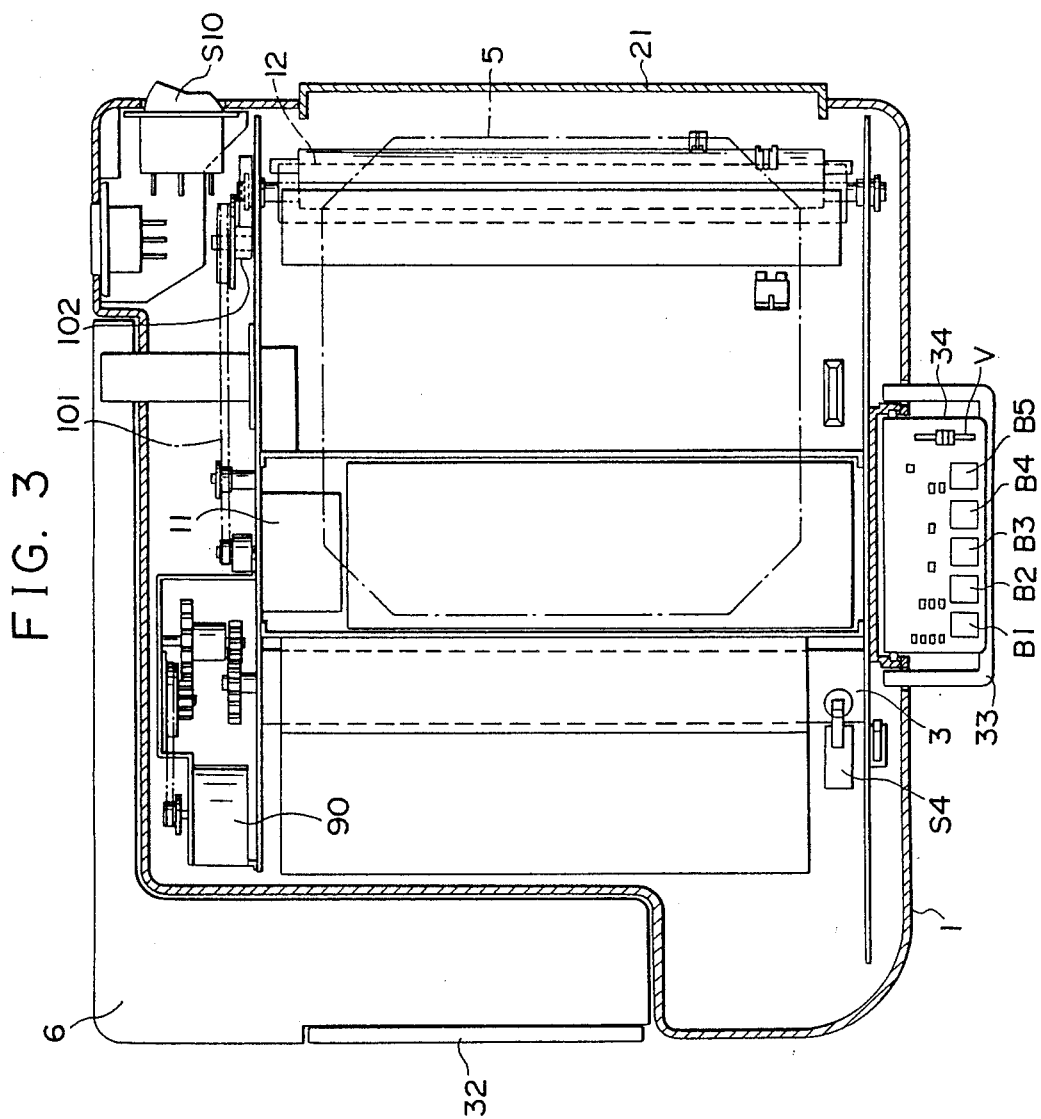
FIG. 3 is a plan view of FIG. 2, showing the interior of the apparatus.
Figure 4:
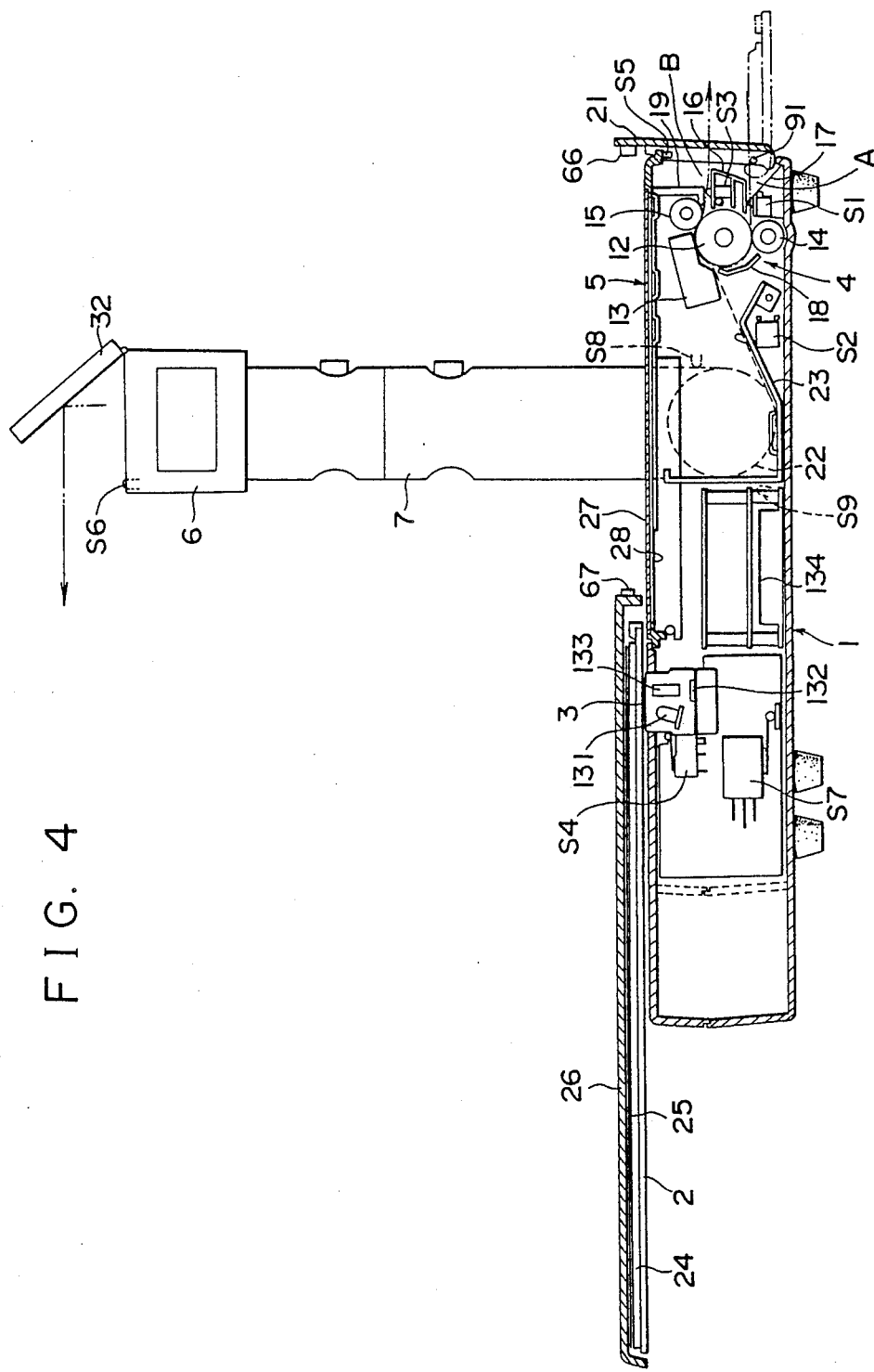
FIG. 4 is a vertical cross-sectional view of FIG. 1, showing the apparatus as it is used as OHP.

The printing mechanism 4 is composed of a printing means, an automatic paper-supply means for automatically supplying a paper from a roll accomodated in the body 1, a manual paper-supply means for supplying a sheet of paper at a time by hand, and a paper-discharge means. Specifically, as shown in FIGS. 3 and 4, a platen 12 driven by a motor 11 is furnished with the printing means, e.g. a thermal head 13, a supply roller 14 disposed in contact with the lower portion of the platen 12, and a discharge roller 15 disposed in contact with the upper portion of the platen 12. A paper inlet port A is composed of upper and lower guides 16,17, through which a sheet of paper may be inserted into the body 1 by hand. The paper from the inlet port A is supplied by the supply roller 14 to the platen 12 via an auxiliary guide 18 which serves to reversely supply the paper onto the platen 12. Another auxiliary guide 19 is disposed at a paper outlet port B in confronting relationship to the upper guide 16. Thus the inlet and outlet ports A, B are arranged at one and the same end of the body 1; when it is not in use, the inlet and outlet ports A, B are closed by a paper-delivery tray 21 pivotally mounted on the body 1. When it is in use, the paper-delivery tray 21 is pivotally moved about a shaft 91 from the solid-line position to the phantom-line position (FIG. 4) to open both the inlet and outlet ports A, B.

The motor 11 transmits rotation, as reduced to a predetermined rate, to the platen 12 via a timing belt 101 and an intermediate gear 102.

A roll-paper tray 23, which is mounted in the body 1, serves as a guide to assist in supplying the paper from the roll 22 onto the platen 12 and then to the discharge roller 15. Designated by S1 is a paper-supply switch (or sensor); S2, a roll-paper detecting switch; S3, a paper-discharge switch The support table 2 includes a transparent plate 24, such as a sheet of glass, for supporting thereon an original 25. An original cover 26 is pivotally mounted on one end of the transparent plate 24 by means of a shaft (not shown) when the original cover 26 is in open position, an original 25 to be copied as described below can be placed on the support table 2. As it is driven by the motor 90, the support table 2, together with the original cover 26, is moved between the focusing plate 5 and the read-out unit 3. The read-out unit 3 is composed of a contact-type image sensor 132, for example, and is furnished with a switch S4 for detecting the termination of copying of an original 25.

As the read-out unit 3 starts reading the original, the support plate 2 is moved in timed relation to the reading. During that time, the rays of light illuminating the original 25 from a light source 131, such as a lamp, through the transparent plate 24 is focused on the contact-type image sensor 132 by means of an array of focusing lens 133, and as a result, the original 25 is read out at regular intervals in sub-scanning direction. The data of every line having been read out is digitalized in binary codes bit by bit in the primary scanning direction.

The binary processing will now be described in detail. As shown in FIG. 11(A), the image sensor 132 is composed of a number of photoelectric transducer elements arranged in a line; when light is illuminated over the original 25, each of the photoelectric transducer elements stores an amount of electric charge commensurate with the amount of illuminated light. The data in terms of light from the image sensor 132 are processed by a binary processor circuit 251 and are then inputted to the thermal head 13 from a data input unit. A timing pulse generator circuit 253 outputs a timing pulse to the image sensor 132, the binary processor circuit 251 and an output gate circuit 255. When a timing pulse is outputted from the timing-pulse generator circuit 253 to the output gate circuit 255, the timing pulse is divided into two parts; one part of the timing pulse is outputted directly to the output gate circuit 255, while the other part is outputted to the output gate circuit 255 via a quarternary counter 257. Then the pulse sorted by the output gate circuit 255 is inputted to the thermal head 13 from a writing clock input unit.

Figure 11B:
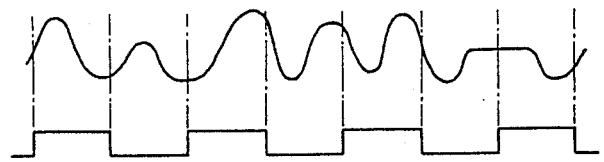
FIGS. 11(A) through 11 (G) illustrate the function of forming a reduced image.
Figure 11C:
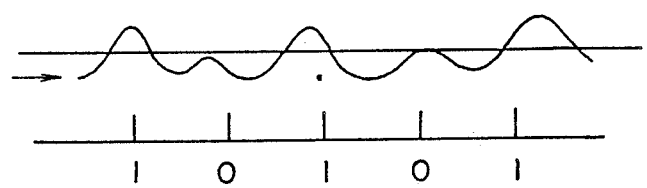
Figure 11D:
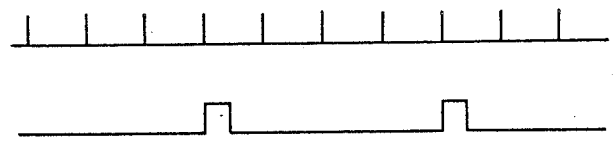

As shown in FIG. 11(B), the image sensor 132 produces an amount of voltage, as an output, proportional to the electric charge stored in the individual photoelectric transducer element, at the same timing with a sensor clock pulse produced by the timing pulse generator circuit 253. Then, as shown in FIG. 11(C), if this output is over or under the slice level at the pulse of the timing pulse generator circuit 253, it is determined as 1 or 0. Thus the output of the timing pulse generator circuit 253 has been digitalized. This digitalization is performed by the binary processing circuit 251. Now if copying is made as data are transmitted to the thermal head 13, an equiscale copy can be obtained. Alternatively, a reduced scale copy may be obtained and then may be projected as enlarged. For example, if binary processing is discontinued every four bits, every fourth bits of a single line are culled out to reduce the length of the line to ¾. Then if printing is made as data are transmitted to the thermal head 13 after complementing the culled-out single line with a blank by ¼, an image reduced to ¾ in the primary scanning direction can be obtained. In other words, as the timing pulses outputted from the timing pulse generator circuit 253 are counted by the quarternary counter 257, it is possible to issue a pulse every fourth timing pulses, as shown in FIG. 11(D). Assuming that a timing pulse is outputted when the output of the quarternary counter 257 is 0 and that outputting of a timing pulse is stopped by the output gate circuit 255 when the output of the quarternary counter 257 is 1, a timing clock pulse of FIG. 11(E) can be obtained. Since only when a pulse is inputted to the writing clock input unit, the thermal head 13 fetches the data in the data input unit supplied from the binary processor circuit 251, a portion indicated by X in FIG. 11(F) is ignored. As a result, the data stored in the thermal head 13 are as shown in FIG. 11(G). This is the method of reducing data to ¾ in the primary scanning direction.

It is possible to reduce data to ¾ by determining the line feed speed to be 4/3 with respect to the paper feed speed of the platen 12.

As the printing is thus made, the original is copied on a transparent sheet for OHP on a reduced scale of ¾. The resultant copy is then placed on the focusing plate 5 so that the transparent original can be projected on an enlarged scale. The projecting function of the projecting unit 6 is such that the focus of a projecting lens (described below) can be adjusted, irrespective of the distance between the screen and the body 1. Therefore, the image may be projected on an enlarged scale depending on the purpose.

Figure 5:
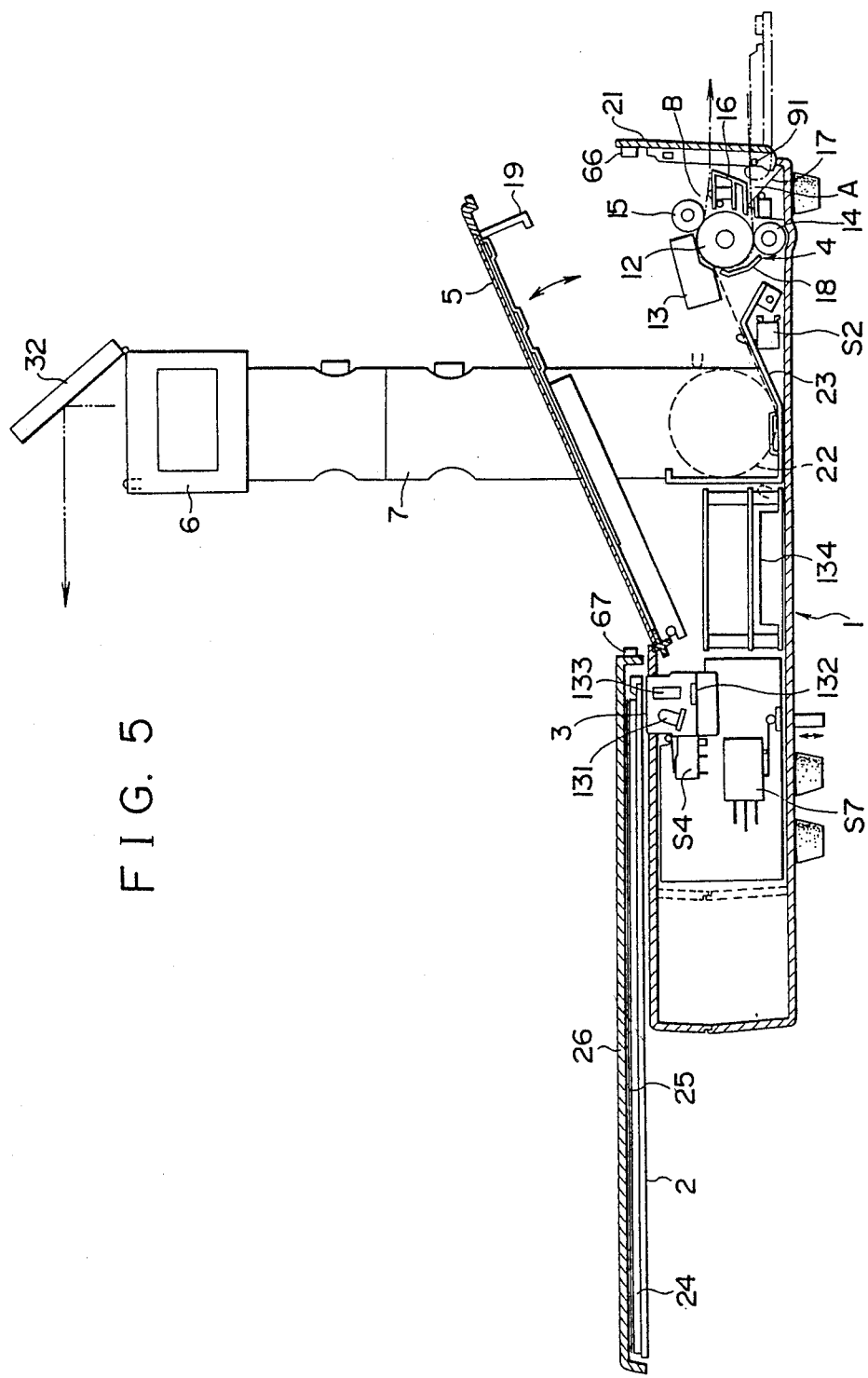
FIG. 5 is a view similar to FIG. 4, but showing the focusing plate in an open position.

The reflection-type focusing plate 5 generally includes a fresnel lens 27 and a relacting layer 28 formed on the rear surface of the fresnel lens 27 by vacuum vaporation of metal. The focusing plate 5 is pivotally mounted on one end of the body 1, as shown in FIG. 5. The switch S5 is a switch for detecting whether the focusing plate 5 is set precisely in the body 1, as shown in FIG. 4. The printing mechanism 4 is disposed under the focusing plate 5 in the body 1. In the illustrated embodiment, the printing mechanism 4 including the thermal head 13 is used as the image forming mechanism. Alternatively, the imageforming mechanism may be an electrophotographic copying machine, a laser printer or the like.

Figure 6:
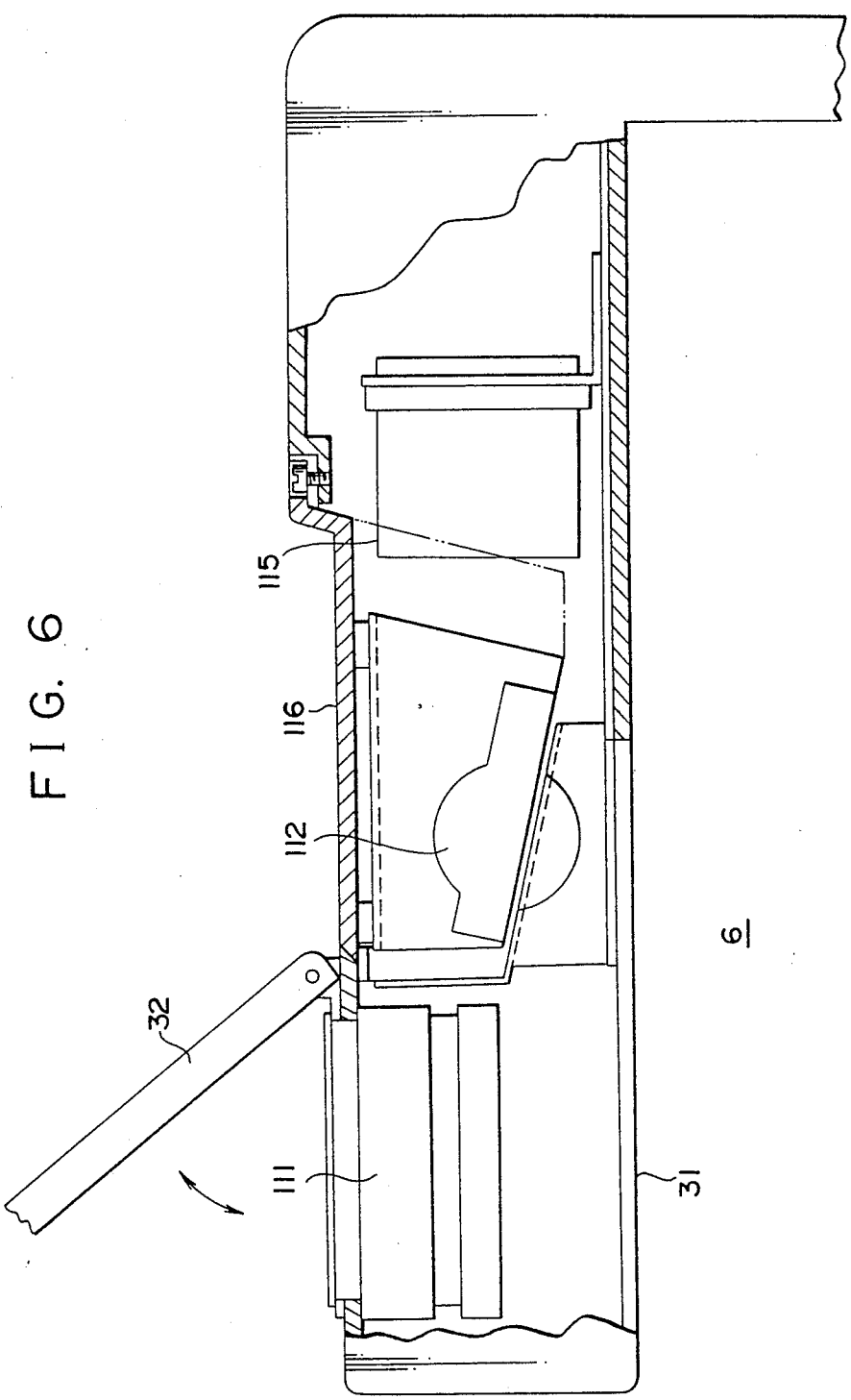
FIG. 6 is an enlarged detail cross-sectional view of a projecting unit of the apparatus.
Figure 8:
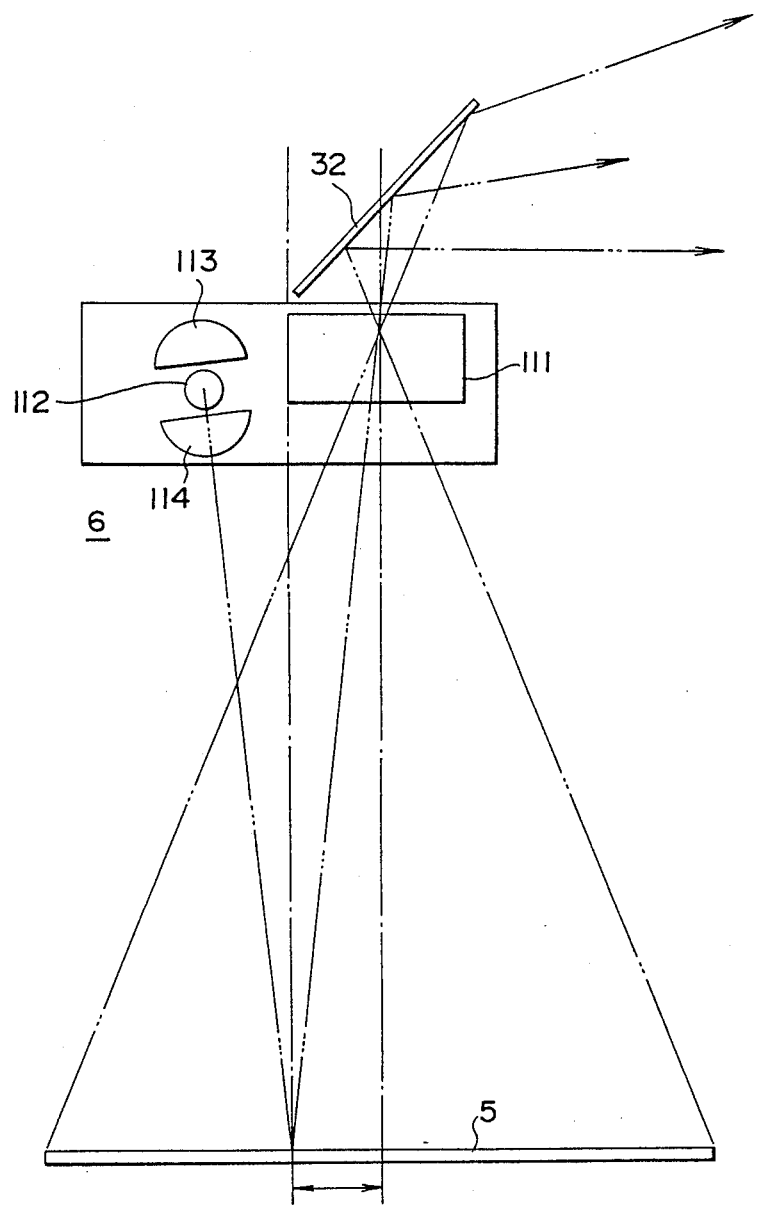
FIG. 8 is a schematic view showing the optical system of OHP.

The projecting unit 6 is swingably mounted on the one side of the body 1 via an arm 7; when utilizing the image forming function of the apparatus, the projecting unit 6 is laid flat along the side of the body 1. The projecting unit 6 can be accomodated along the side of the body 1 remotely from the paper inlet and outlet ports A, B so that the image forming function can be utilized. The projecting unit 6, as shown in FIGS. 6 and 8, has within a frame 31 a projecting lens 111, a lamp 112, i.e. a halogen lamp, for illuminating the transparent original placed on the focusing plate 5, a reflector mirror 113 disposed on one side of the lamp 112, a focusing lens 114 disposed on the other side of the lamp 112, and a cooling fan 115. If a closure 116 mounted on the upper surface of the projecting unit 6 is opened, the lamp 112 can be removed for replacement with a new one. The reflector mirror 32 is angularly movable through an angle of 360° about the projecting lens 111 so that the original can be projected in all directions.

As shown in FIG. 8, light from the lamp 112, together with the light reflected by the reflector mirror 113, is projected on the focusing plate 5 by the focusing lens 114. The fresnel lens constituting the focusing plate 5 is an eccentric mirror; the center of size of the mirror is aligned with the center of the projecting lens 111, while the optical center of the fresnel lens is eccentrically displaced and is disposed centrally between the lamp 112 and the projecting lens 111. Since the center of size of the fresnel lens is aligned with the center of the reflector mirror 32, the image of the transparent original placed on the fresnel lens is completely covered by the projecting lens 111 without cutting any part of the image.

Figure 7:
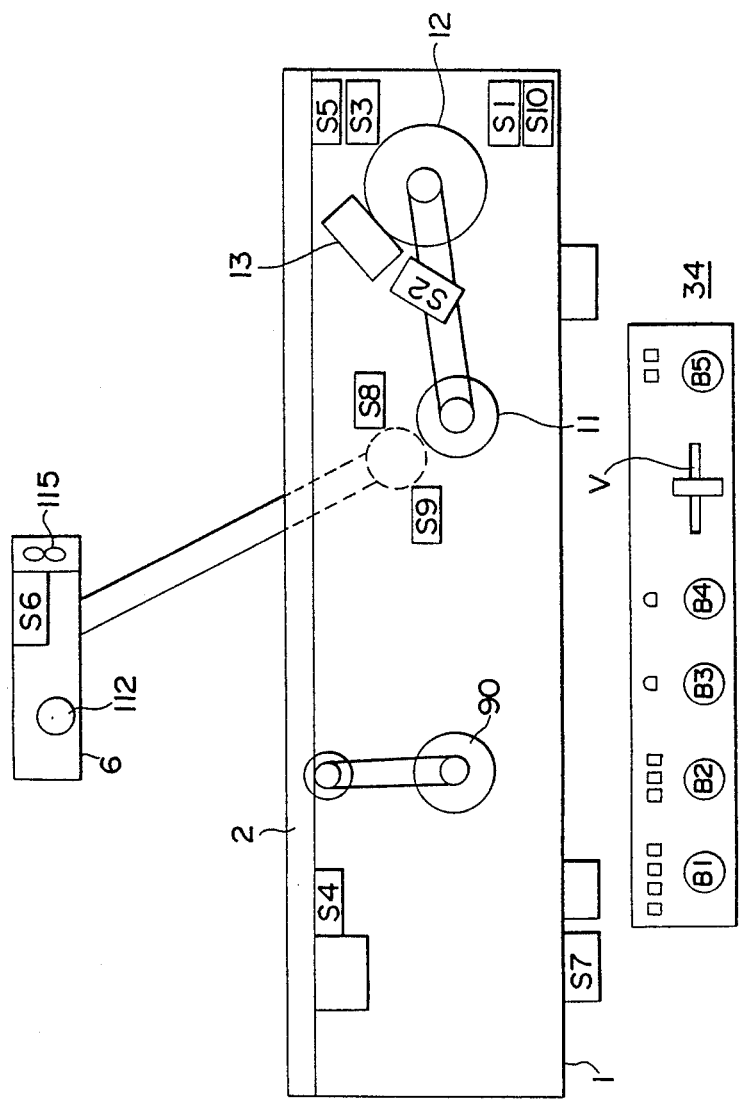
FIG. 7 is a schematic view showing the arrangement of various switches.

S6 designates a switch for detecting whether the reflector mirror 32 is accomodated in the projecting unit 6, and S7 designates a switch mounted on the body 1, as shown in FIG. 7. Further, S8 designates a switch for detecting whether the projecting unit 6 is disposed in an operative position, while S9 designates a switch for detecting whether the projecting unit 6 is disposed in an accomodated position. Accordingly, when the projecting unit 6 is accomodated along the body 1, the lamp 112 is switched off without fail in response to the detection of the position of the projecting unit 6. When the projecting unit 6 is not disposed in the accomodated position or the operative position, copying cannot be done so that any collision of the support table 2 against the projecting unit 6 can be prevented.

Thus the lamp 112 cannot be turned on unless the switch S8 is switched on; when the switch S8 is switched off while the lamp 112 is on, the lamp 112 is turned off immediately.

Figure 9:
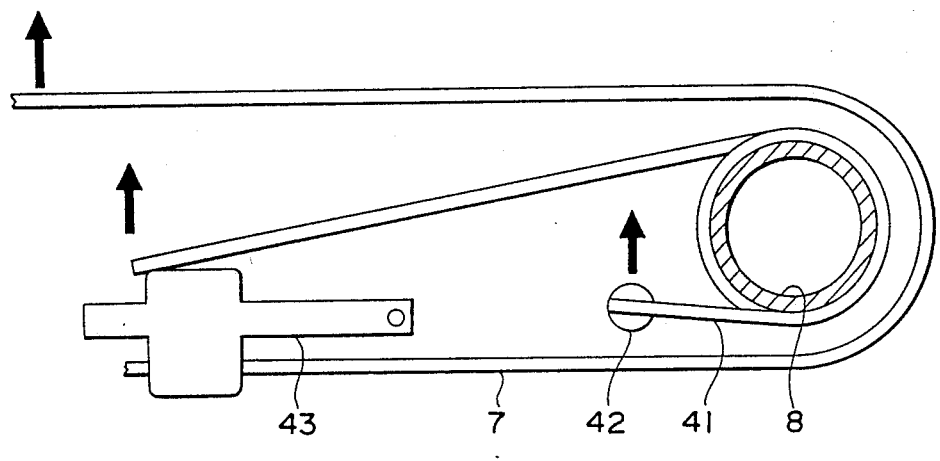
FIG. 9 is a fragmentary enlarged cross-sectional view of an arm of OHP, showing a friction mechanism of the arm.

A friction mechanism is mounted on the shaft 8 by which the projecting unit 6 is pivotally connected to the body 1 via the arm 7. This friction mechanism, as shown in FIG. 9, includes a spring 41 for locking the arm 7 is wound several times around the shaft 8; one end of the spring 41 is fixedly secured to the arm 7 by a stop 42, while the other end is free and is dipped against a lock release lever 43 for releasing the locking of the arm 7. When the arm 7 is to be moved from the horizontal position to the vertical position, the spring 41 is loosened with respect to the shaft 8 so that the arm 7 can be moved to the vertical position. Reversely, when the arm 7 is to be moved from the vertical position to the horizontal position, the spring 41 is tightened with respect to the shaft 8 so that the arm 7 is locked from being laid flat along the side of the body 1. As the lock release lever 43 is depressed, the spring 41 is loosened with respect to the shaft 8 so that the arm 7 can be laid flat.

Figure 10:
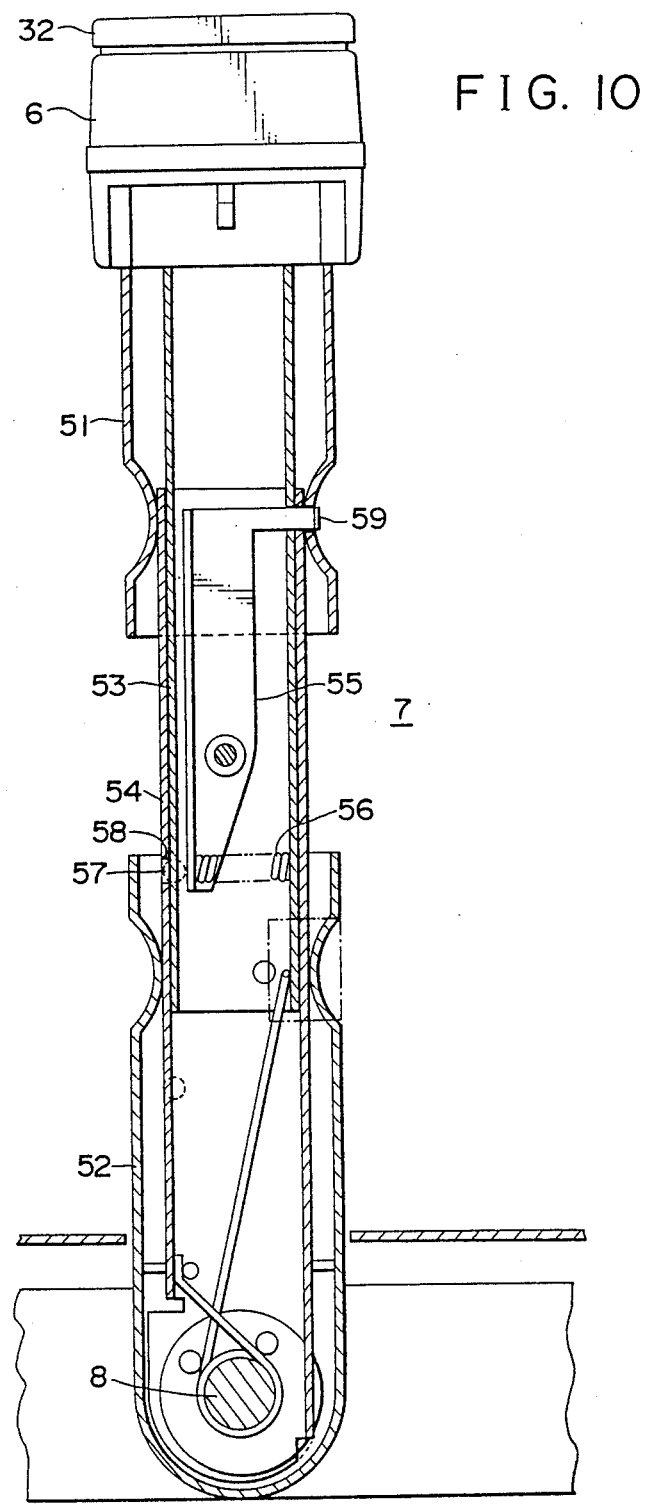
FIG. 10 is a cross-sectional view of the arm of OHP.

As shown in FIG. 10, the arm 7 is composed of first and second outer tubes 51, 52 and first and second inner tubes 53, 54 fixedly connected to the first and second outer tubes 51, 52, respectively. The first and second inner tubes 53, 54 are telescopically connected so that the arm 7 is extendable. Designated by 55 is a stop lever pivotally mounted in the first and second inner tubes 53, 54; one end of the stop lever 55 is urged by a spring 56 so as to normally to project into locking holes 58 of the first and second inner tubes 53, 54. The other end of stop lever 55 is connected to a button 59 which is mounted on the first outer tube 51. As the button 59 is depressed inwardly of the first outer tube 51, a ball 57 is brought out of the second (outside) inner tube 54 to allow the arm 7 to be extended. If the depressing force is released from the button 59, the ball 57 is brought into a predetermined pair of the locking holes 58 of the inner tubes 53, 54 to keep the arm 7 in a predetermined length.

To the body 1 and the lamp 112, as shown in FIG. 11, a power source unit 81 which is controlled by a controlling unit 134 such as a central processing unit is connected. The power source unit 82 includes a power source switch S10, a power source 82, a first relay 83 disposed between the power source 82 and the lamp 112, and a second relay 84. By the control of the controlling unit 134, both the relays 83, 84 are prevented from making connections.

The capacity of the power source 82 is set to a value larger than the larger one of the consumptions of the body 1 and the lamp 112 and smaller than the sum of the consumptions of the body 1 and the lamp 112.

As shown in FIG. 1, a handle 33 is pivotally mounted on the body 1 at one side remote from the projecting unit 6, and an operation panel 34 is disposed inwardly of the handle 33 and is pivotally mounted on the side of the body 1. On the operation panel 43, as shown in FIGS. 3 and 7, there are provided a paper selection switch B1, a multiplying-factor selection switch B2, a lamp switch B3 for turning the lamp 112 on and off, a copy start/stop switch B4, a mode (character/photo) change over switch B5, and a concentration adjusting knob V.

The paper selection switch B1 serves to designate, as a printing paper, one between an OHP sheet and a heat-sensitive paper.

The multiplying-factor selection switch B2 serves to designate, as a multiplying factor for copying, one among equiscale, enlarged scale and reduced scale.

Figure 12:
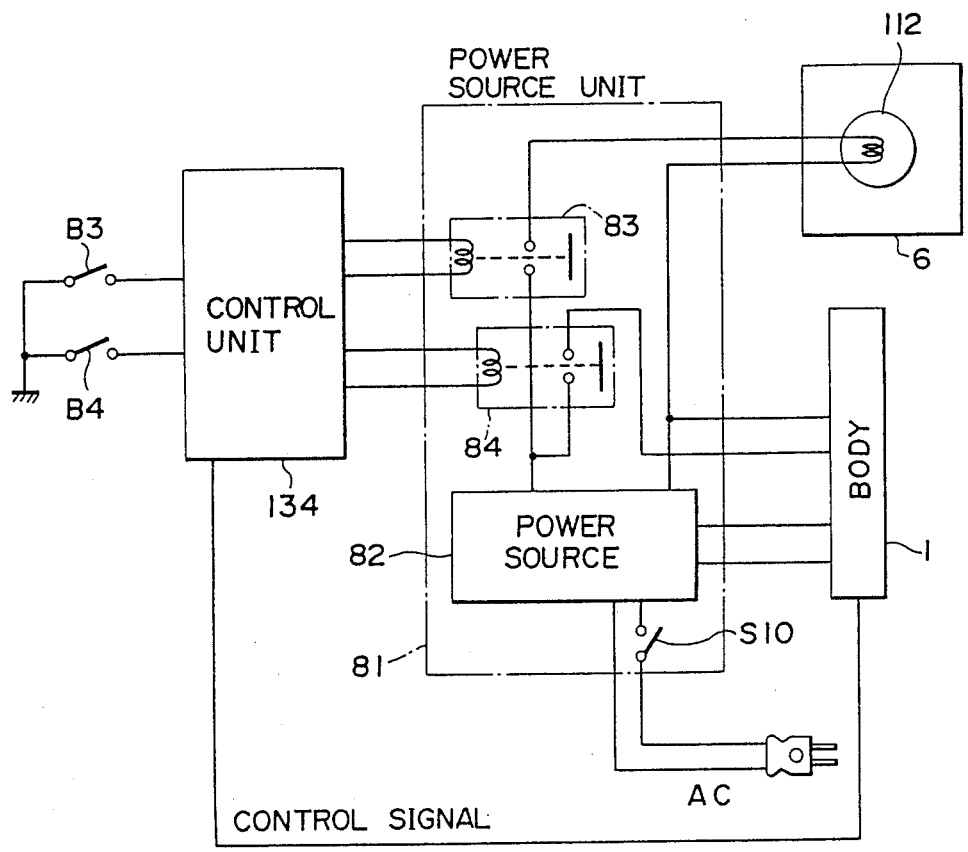
FIG. 12 is a wiring diagram of a switch control circuit.

As the lamp switch B3 is depressed while the lamp 112 is off, the first relay 83 of FIG. 12 makes a connection to turn the lamp 112 on. As the lamp switch B3 is depressed while the lamp 112 is on, the first relay 83 breaks the connection to turn the lamp 112 off.

As the copy start/stop switch B4 is depressed while the image forming unit is not operative, the second relay 84 makes a connection to start copying. As the copy start/stop switch B4 is depressed while the image forming unit is operative, the second relay 84 breaks the connection to stop copying.

If the copy start/stop switch B4 is depressed while the lamp switch B3 is on, this input is ignored. Reversely, if the lamp switch B3 is depressed during copying as the copy start/stop switch B4 is on, this input also is ignored. There is no priority between the copy start/stop switch B4 and the lamp switch B3; it is only enough that copying is impossible while the lamp 112 is on, and lighting of the lamp 112 is impossible during the copying. However, if a paper is inserted in the inlet port A while the lamp 112 is on, the paper can be supplied, irrespective of the power source and the illumination heat of the lamp 112.

As shown in FIGS. 4 and 5, a magnet 66 is mounted on a free end of the paper tray 21 and is adapted to be attracted to a companion magnets 67. These two magnet 66, 67 serve to prevent any accidental opening of the original cover 26 and also any accidental moving of the support table 2.

The handle 33, as shown in FIGS. 13(a) and 13(B), is pivotable about a shaft 60 and can be accomodated along the side of the body 1. This handle 33 has also the function of restricting the movement of the support table 2 in response to the pivotal movement of the handle 33. Specifically, a cam 61 is mounted on the shaft 60 of the handle 33, and the body 1 and the frame of the support table 2 have an insertion hole 63 and a locking hole 64, respectively, into which holes a locking pin 62 is movably inserted. The locking pin 62 is normally urged against the cam 61 by a spring 65.

While the handle 33 is in an accomodated position in which the handle 33 is laid flat along the side of the body 1 as shown in FIG. 13(A), the locking pin 62 is retracted from the locking hole 64 under the bias of the spring 62 to thereby allow the support table 2 to move. On the contrary, while the handle 33 is in a raised position to carry the apparatus, the locking pin 62 is pushed upwardly by the cam 61 to project into the locking hole 64 so that the support table 2 is locked so as not to move.

The mode of operation of the apparatus will now be described. To utilize the image forming function of the apparatus, the original cover 26 is opened, and then an initial original is placed on the transparent plate 24 with the image surface facing the transparent plate 24, and thereafter the original cover 28 is closed. Then the copy start/stop switch B4 mounted on the operation panel 34 is depressed to start the copying operation of the apparatus. In place of a heat-sensitive copy paper, a sheet such as a heat sensitive color forming paper or a heat-sensitive transfer paper is supplied to the paper supply unit of the body 1 so that an original for OHP (hereinafter called "OHP") can be formed from the initial original. For manual insertion of a copy paper, the paper tray 21 is laid flat, and then a paper is supplied to the body 1 from the inlet port A by hand. The paper is then supplied between the paper supply roller 14 and the platen 12 for printing. If the paper is a roll paper, the roll paper is supplied from the paper guide 23 directly between the platen 12 and the discharge roller 15.

in order to use the apparatus as OHP, the support table 2 is moved from the reflection-type focusing lens 5, i.e. the fresnel lens, and an OHP original is placed, whereupon the lamp switch B3 on the operation panel 34 is depressed. In response to the depression of the lamp switch B3, the OHP original is illuminated by the lamp 112, the light of this illumination is reflected by the focusing plate 5. The reflected light reaches the screen via the projecting lens 111 and the reflector mirror 32, both mounted in the projecting unit 6. As a result, an image of the OHP original is projected on the screen.

More specific operation of the apparatus will now be described with reference to FIGS. 14(A) through 14(D).

Figure 14A:
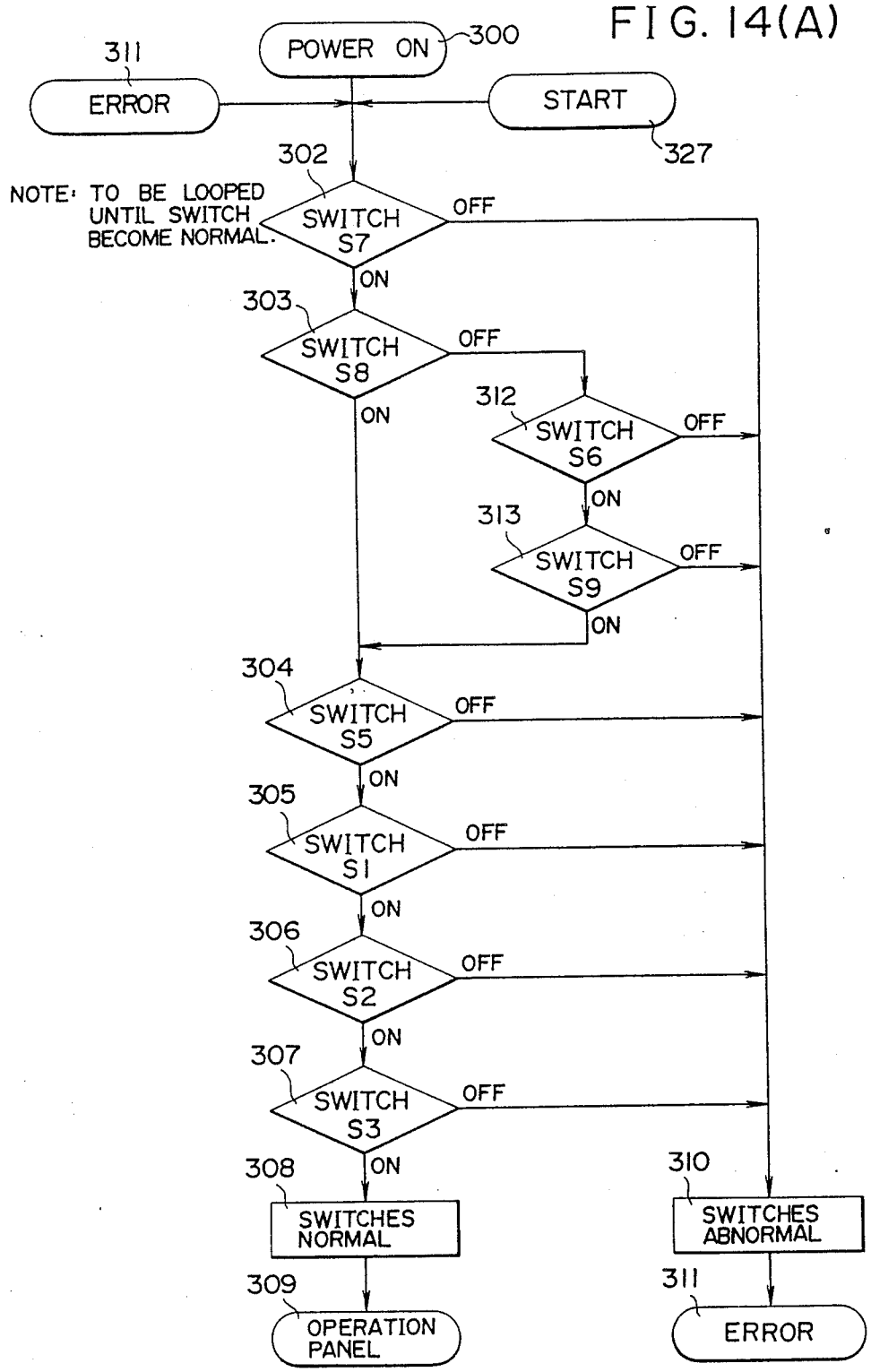

In FIG. 14(A), at step 300 the power source switch S10 is switched on to power the apparatus.

Then at steps 302 to 307, it is checked whether the switches S7, S8, S5, S3 are all on or off; if they are on, it is judged at step 308 that these switches are normal so that the operations of the operation panel 34 can be performed at step 309.

If each of these switches is off, all of the switches except the switch S8 are judged as abnormal at step 310. At step 311 these abnormal switches (copy start/stop switch B4 is on) are looped until they become normal.

If the switch S8 is off, it is checked at steps 312, 313 whether both the switches S6, S9 are on or off to judge whether the reflection mirror 32 and the projecting unit 6 are accomodated or not.

Figure 14B:
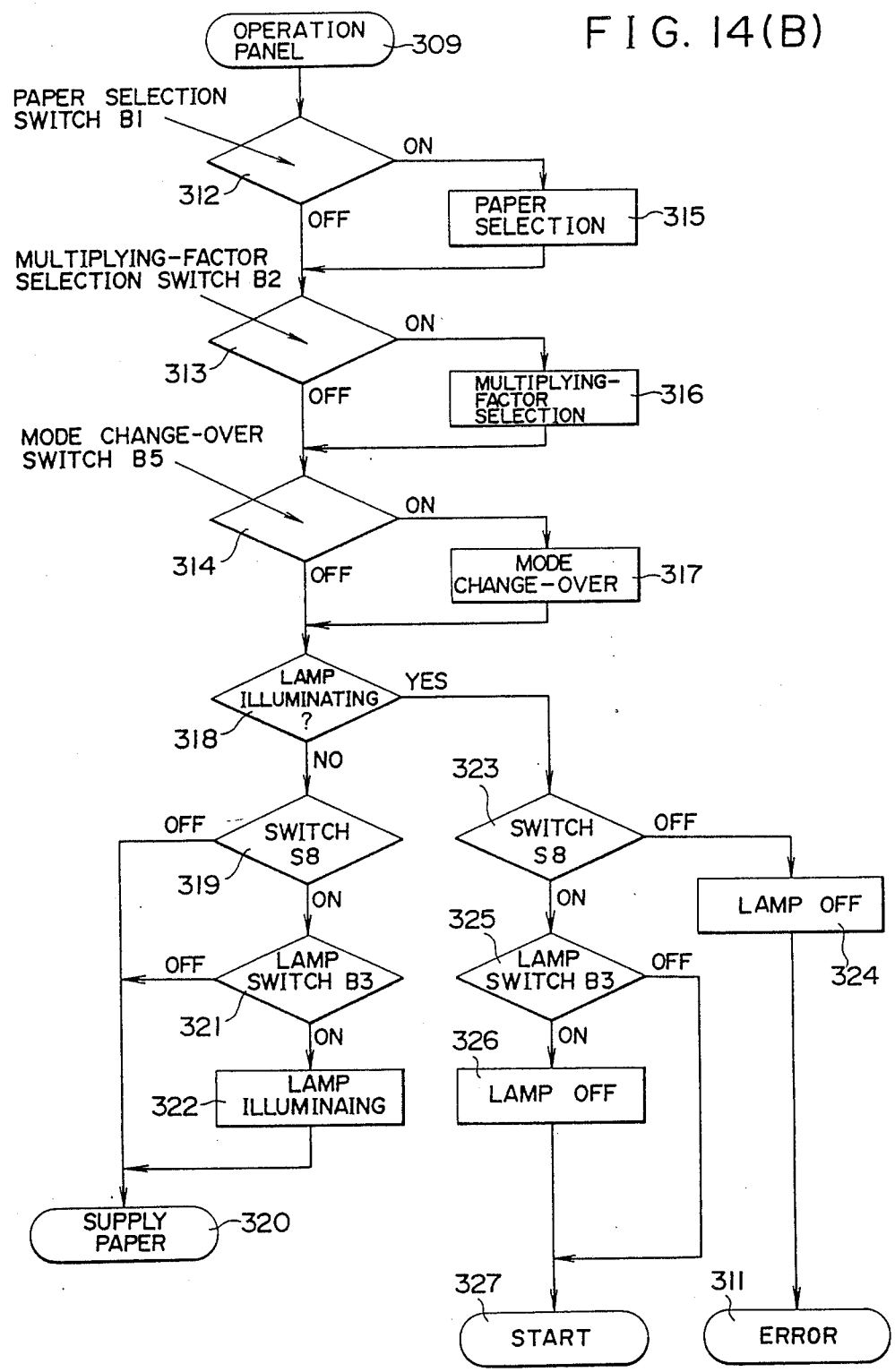

When the operations of the operation panel 34 have been made possible, it is checked at steps 312, 313, 314, as shown in FIG. 14(b), whether the paper selection switch B1, the multiplying-factor selection switch B2, and the mode change-over switch B5 are all on or off. If they are on, selection of a paper, selection of a multiplying power, and change-over of a mode are performed at steps 315, 316, 317.

Upon termination of selection of a paper and a multiplying power and of changeover of mode, it is checked at step 318 whether the lamp 112 is turned on. If the lamp 112 is on, it is judged at step 319 whether the projecting unit 6 is set (switch S8 is on) or not; if the switch S8 is off, the paper supplying can be performed.

Further, with the projecting unit 6 having been set, if the lamp switch B3 is switched on at step 321, the lamp 112 is turned on at step 322, whereupon go to step 320. If the OHP original is set on the focusing plate 5 when the lamp 112 is on, the OHP original is projected on the screen via the projecting lens 111 and the reflector mirror 32.

If the lamp 112 is judged at step 318 as it is on, the condition of the projecting unit 6 is judged at step 23. If the switch S8 is off (projecting unit 6 is not set), the lamp 112 is turned off at step 324, whereupon go to step 311 of FIG. 14(A).

If the switch S8 is on at step 323, the lamp switch B3 is switched on to turn the lamp 112 off, whereupon go to step 327 of FIG. 14(A).

Figure 14C:
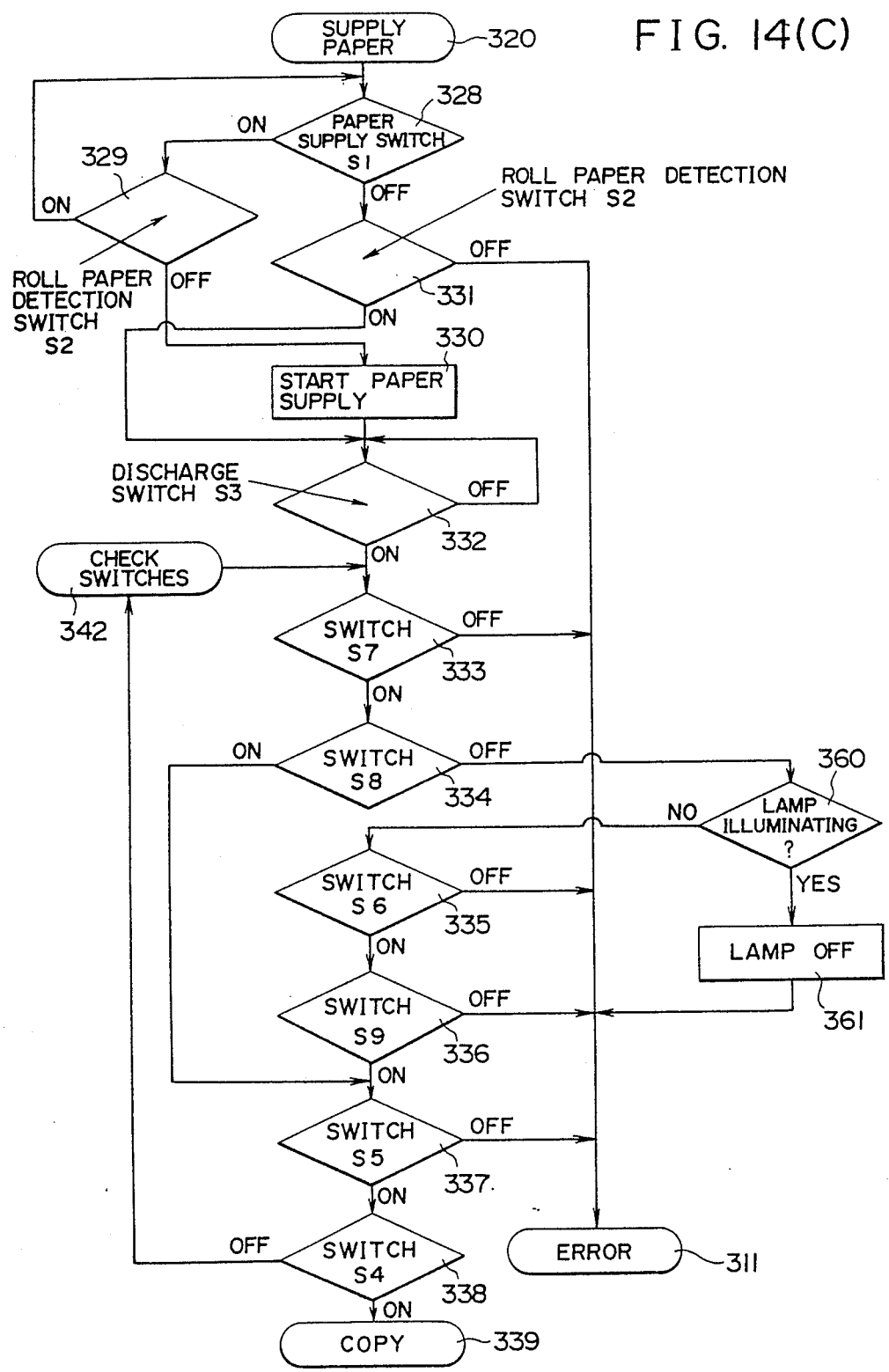

If go to the paper supplying operation at step 320, the condition of the switch S1 is judged at step 328 as shown in FIG. 14(C). Thus it is checked whether the paper is set in the paper inlet port A or not.

If the paper supply switch S1 is on, the condition of the roll paper detection switch S2 is judged at step 329, namely, it is checked whether the roll paper is set or not. If the roll paper is not set, the platen 12 is driven to supply a paper inserted by hand.

If the paper supply switch S1 is off at step 328, it is checked at step 331 whether the roll paper detection switch S2 is on or off; if it is off, go to FIG. 14(A).

If the roll paper detection switch S2 is on at step 331, or if the paper supply operation starts at step 330, the condition of the discharge switch S3 is checked at step 332. If the discharge switch S3 is on, it is an error when the switch S7 is off at step 333, whereupon go to step 311.

If the switch S7 is on, the switch S8 is checked at step 334. If the switch S8 is on, go to step 337. If it is off, it is checked at step 360 whether the lamp 112 is turned on or off; if it is off at step 361, it is an error, whereupon go to step 311.

If the lamp 112 is off, it is checked at steps 335, 336 whether the switches S9, S5 are both on or off. If they are off, it is an error, whereupon go to step 311. If they are on, the switch S4 is checked at step 338, and the support table 2 is set at the starting position by hand. If the switch S4 is switched on, go to step 339.

If the Switch 54 is off, return to step 342 to check the switch S4 until the switch S4 is turned on.

Figure 14D:
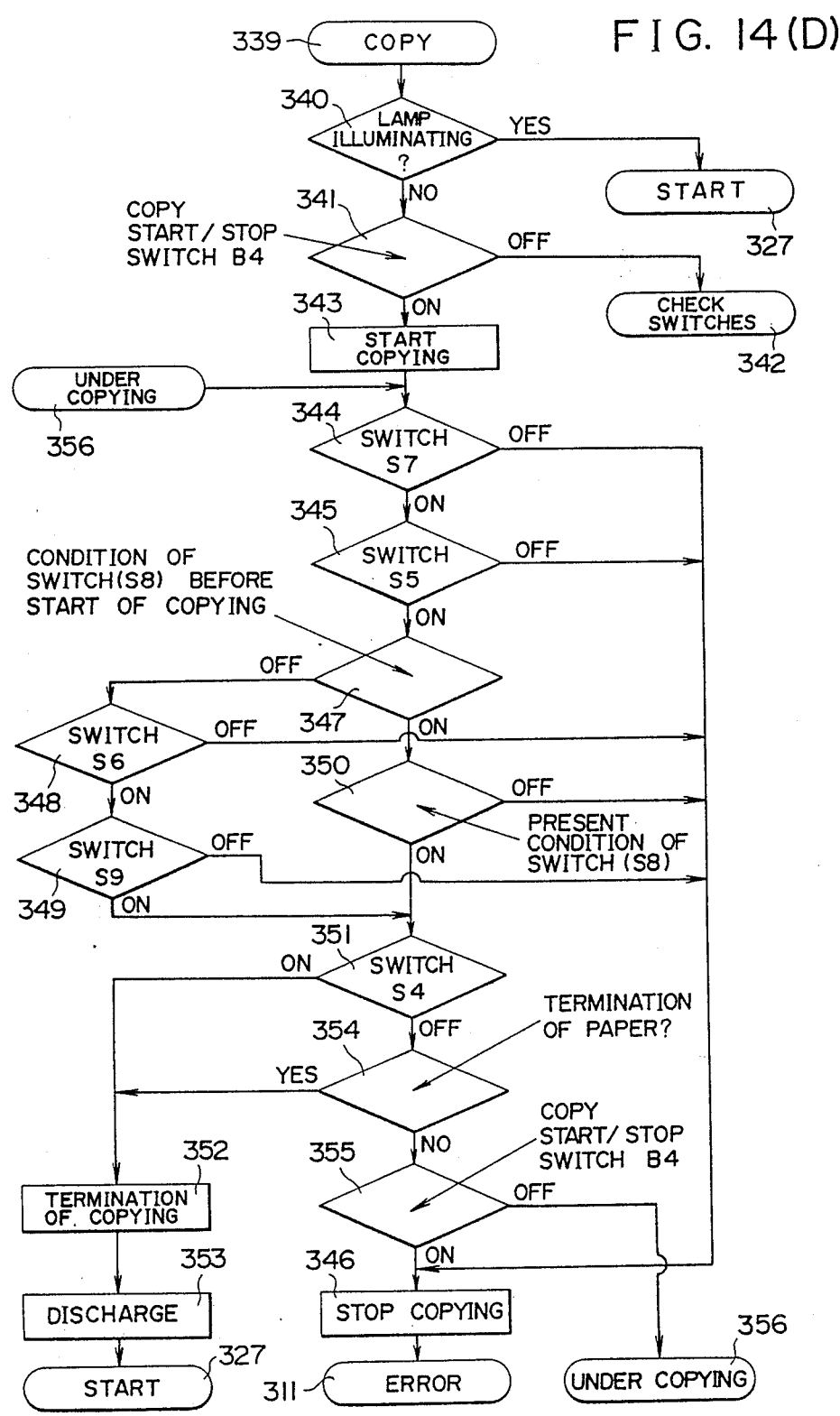

When go to step 339, it is judged at step 340, as shown in FIG. 14(D), whether the lamp 112 is on or not. If it is on, go to step 327 of FIG. 14(A). Thus even if a paper is set while the lamp 112 is on, copying operation is impossible.

If the lamp 112 is off, the switch S4 is checked at step 341. If it is off, go to step 342 of FIG. 14(C) to check the switch S4.

If the switch S4 is switched on, copying operation starts at step 343. As the motor 90 is thereby driven, the support table 2 on the focusing plate 5 starts moving leftwardly. After the original is read out by the read-out unit 3, printing is performed by the thermal head 13.

At that time, if the switches S7, S5 are both switched off, copying operation is stopped at step 346, whereupon go to step 311 of FIG. 14(A). If the switches S7, S5 are both on, the condition of the switch S8 before copying starts is checked at step 347.

If the switch S8 is off, the accomodated conditions of the reflector mirror 32 and the projection are checked at steps 348, 349. When the accomodated condition is released (switches S6, S9 are off), copying operation is stopped at step 346.

Even though the switch S8 is on, copying operation is stopped when the switch S8 is switched off at step 350.

Then it is checked at step 351 whether the read-out of the original has been completed or not. If the switch S4 is on, the copying operation is stopped, and the paper is discharged at step 353, whereupon return to step 327 of FIG. 14(A).

If the switch S4 is off, it is checked at step 354 whether a predetermined time has passed after the trailing end of a paper had passed the switch S1 or the switch S2, whereupon copying operation is stopped.

Even before the termination of copying operation, if the copy start/stop switch B4 is positively switched on at step 355, copying operation is stopped; if it remains off, go to step 356.

According to the embodiment described above, partly because the reflection-type focusing plate 5 is disposed in the read-out unit 3, and partly because the projecting unit 6 is disposed above the reflection-type focusing plate 5, any accidental displacement between the reflection-type focusing plate 5 and the projecting unit 6 can be prevented even if the support table 2 is moved, or if the original cover 26 is opened, when the projecting unit 6 is in an operative position. Therefore the image of the OHP original can be projected on the screen without distortion.

Further, partly because the projecting unit 6 is disposed above the reflection-type focusing plate 5, and partly because the printing mechanism 4 is disposed under the reflection-type focusing plate 5, the printing mechanism 4 does not receive any influence of the heat of the projecting unit 6 as the reflection-type focusing plate 5 prevents the heat of the projecting unit 6 from being transmitting to the printing mechanism 4. Even if a roll of heat-sensitive paper is set in the printing mechanism 4, the roll paper is free from being denatured due to heat.

Partly since the printing mechanism 4 is disposed under the reflection-type focusing plate 5, and partly since the paper inlet and outlet ports A, B are arranged vertically on one and the same end of the body 1, it is possible to reduce the image forming unit to a very compact size.

The paper supply tray 21 for manual insertion can also serve as a paper discharge tray.

Furthermore, since the reflection-type focusing plate is openable, maintenance of the printing means and replacement of a roll of paper can be done with ease.

In the foregoing embodiment, the apparatus is operative only when the reflection-type focusing plate 5 is closed. Alternatively, the reflection-type focusing plate 5 may be slightly opened to assume an inclined posture during the projecting operation so that the projected image on the screen can be gotten out of the screen instantaneously (flash out function).

Figure 15:
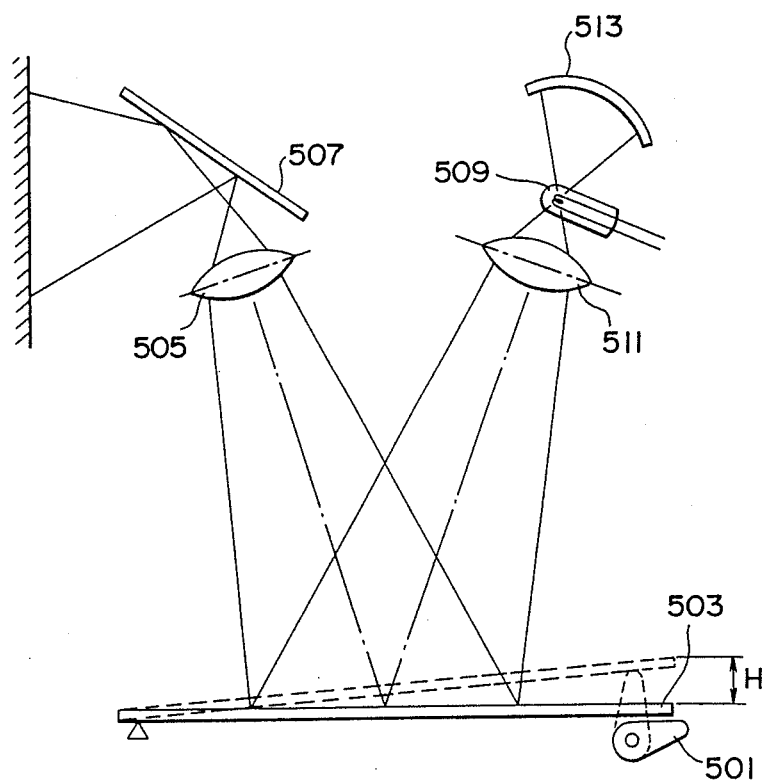
FIG. 15 is a schematic view of a modified optical system in which a flash-out mechanism is incorporated.
Figure 16:
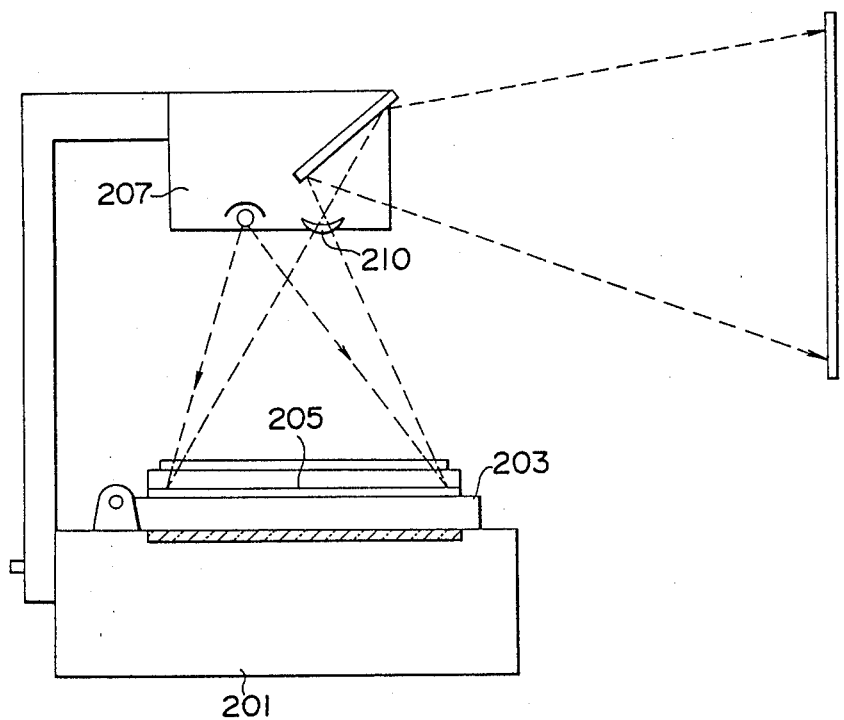
FIG. 16 is a schematic cross-sectional view of a prior art apparatus.

FIG. 15 illustrates an optical system for performing the above-mentioned flash-out function which comprises a fresnel lens 503 as a reflection-type focusing plate, a first focusing lens 505 for converging rays of light from the fresnel lens 503, a reflector mirror 507, a lamp 509 as a light source, a second focusing lens 511 for converging rays of light reflected by the fresnel lens 503, and a cam 501 for varying the height at one corner of the fresnel lens 503. Designated by 513 is a mirror for reflecting light from a light source.

In normal projection, the cam 501 maintains the fresnel lens 503 in a horizontal posture so that rays of light reflected by the fresnel lens 503 are directed to the first focusing lens 505, as shown in FIG. 15. As the cam 501 is angularly moved in an anticlockwise direction to cause the fresnel lens 503 to assume an inclined posture, the angle of incidence of the light from the second focusing lens 511 on the fresnel lens 503 is increased, thus causing the rays of light reflected by the fresnel lens 503 to deviate from the first focusing lens 505. The cam 501 is designed so as to obtain such a height H of inclination that the extent of this deviation is larger than the diameter of the first focusing lens 505.

As the rays of light reflected by the fresnel lens 503 deviates from the first focusing lens 505, the image which had been projected on the screen when the fresnel lens 503 is in a horizontal position disappears. If the cam 501 is returned to its original position, the image appears again on the screen. Consequently, it is possible to realize the flash-out function with a minimum space and without shifting the reflection-type focusing plate 5 laterally.

Figure 18:
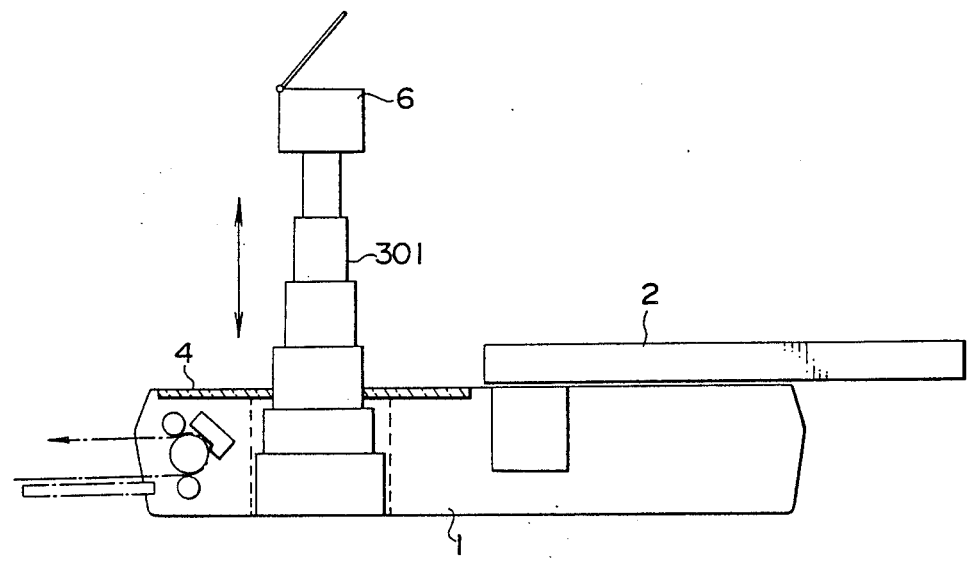
FIG. 18 is a schematic front elevational view of a modified apparatus according to a second embodiment of the invention.
Figure 19:
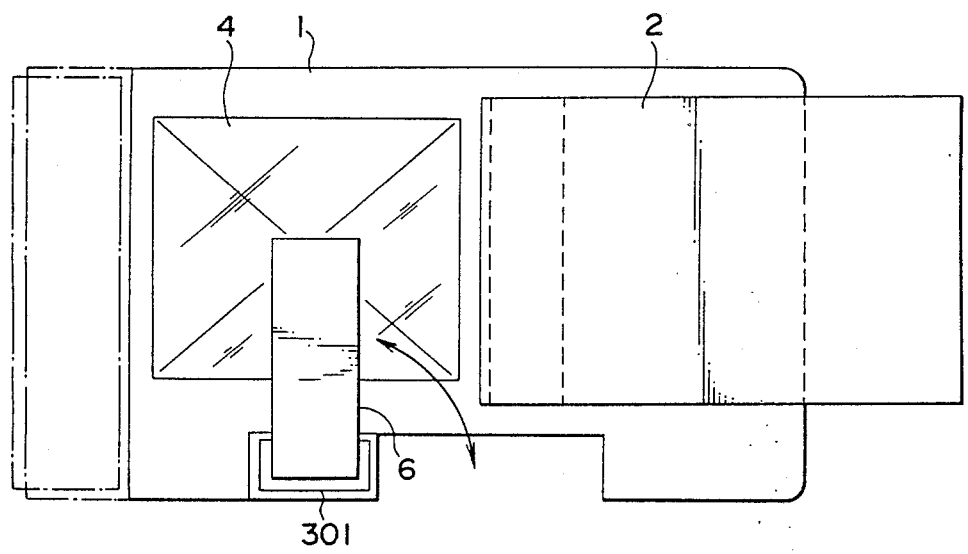
FIG. 19 is a plan view of FIG. 18.

FIGS. 18 and 19 illustrate a modified apparatus according to a second embodiment, in which an arm 301 of the projecting unit 6 is composed of a plurality of tubular members telescopically connected one to another. This multistep arm 301 can be shrunk into one side of the body 1.

The projecting unit 6 can be turned through an angle of 90° about the arm 301, as shown in FIG. 19, and therefore can be accomodated along one side of the body 1 compactly so as not to interfere with the copying operation.

Figure 20:
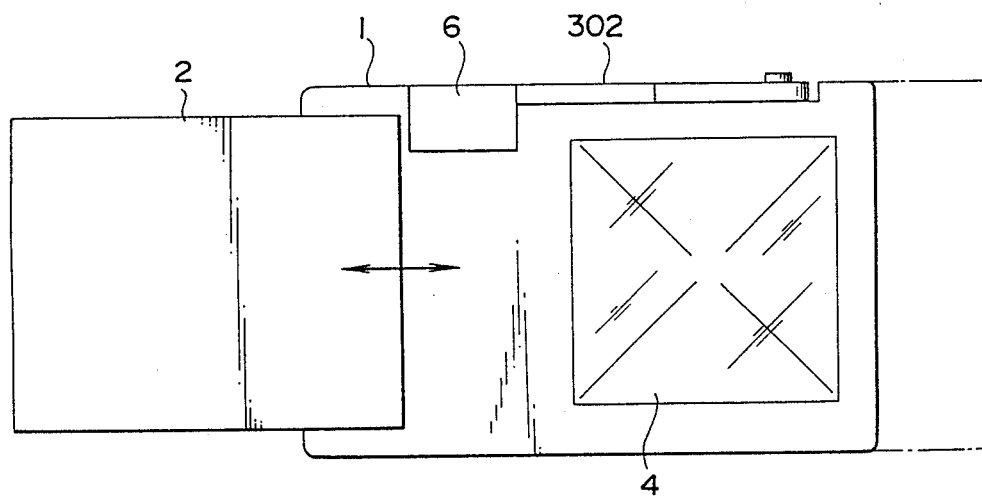
FIGS. 20 and 21 illustrate a third embodiment.
Figure 21:
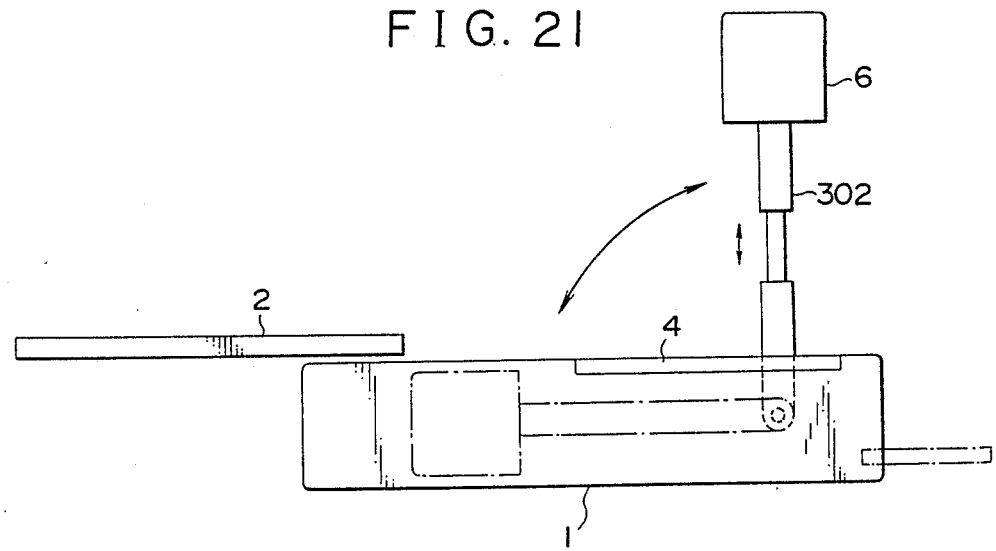
Figure 22:
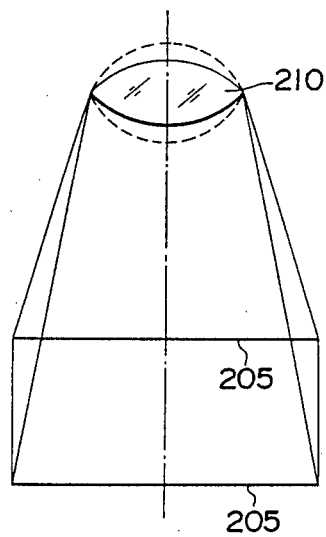
FIG. 22 is a schematic view showing the relationship between a projecting lens and a focusing plate in a prior art apparatus.

FIGS. 20 and 21 illustrate a third embodiment, in which a modified arm 302 of the projecting unit 6 can be axially shrunk to some extent and can be laid flat along one side of the body 1.

With the apparatus according to the second and third embodiments, since the projecting unit can be accomodated along the side of the body with the arm of the projecting unit at least partly shrunk, the projecting unit as shrunk would not interfere with the handling of the original on the support table. Further, since the projecting unit can be accomodated along the body 1 compactly, the apparatus can be carried by one hand.

Further, as shown in FIGS. 11(A) through 11(G), since an OHP original is formed on a reduced scale with respect to the size of the image of an initial original, a reduced size of focusing plate can be used, thus reducing the entire apparatus to a compact size.

Figure 23:
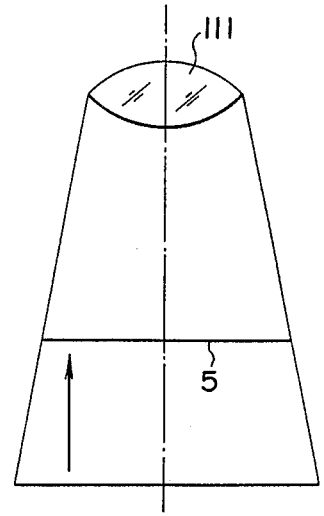
FIG. 23 is a view similar to FIG. 22, showing the relationship between a projecting lens and a focusing plate in the apparatus of the present invention.
Figure 24:
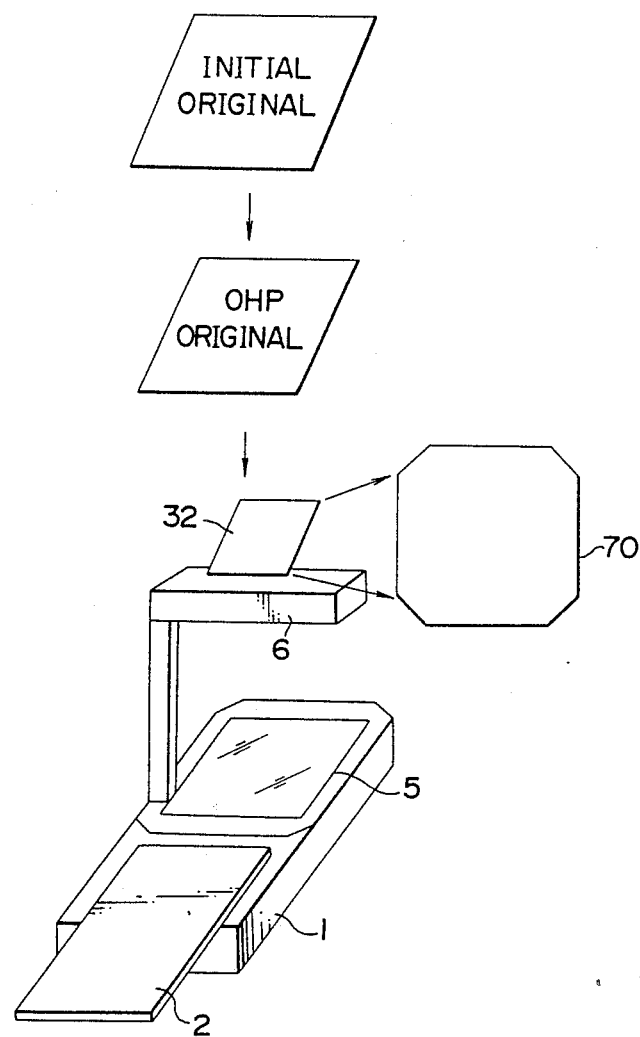
FIG. 24 is a schematic perspective view of the apparatus of the present invention, illustrating the mode of projecting operation

Since the focusing plate 5 is reduced in size, it is unnecessary to use a wide-angle lens for the projecting lens 111 without shortening the distance between the projecting lens 111 and the focusing plate 5, as shown in FIG. 23. Thus it is possible to reduce the size of the apparatus, without any difference in darkness between the marginal and central portions. At that time, as shown in FIG. 24, the focus of the projecting lens can be adjusted, irrespective of the distance between the screen and the projecting unit 6. Therefore the image of the OHP original can be projected on an enlarged scale in order to meet the purpose.

In the illustrated embodiment, the image reducing function of the image forming unit is described in connection with FIGS. 11(A) through 11(G). Alternatively, the image reducing function may be performed by using a lens in reading out the initial original.

Partly since the reflection-type focusing plate has a size smaller than that of the initial-original setting unit, and partly since the OHP original on the focusing plate is projected on the screen on an enlarged scale, it is possible to reduce the apparatus to a compact size.

Further, since relays 83, 84 are disposed between the lamp 112 and the power source 82 and between the latter and the image forming unit and are controlled by the control unit 134, one from the operation of the lamp 112 and the operation of the image forming unit is selected so that the lamp 112 can be prevented from turning on during the image forming operation, guaranteeing safety. Moreover, partly since the capacity of the power source 82 is larger than the larger one between the amount of consumed electric power of the lamp 112 and the amount of consumed electric power of the body 1, and partly since the capacity of the power source 82 is smaller than the sum of the consumed electric power of the body 1 and the lamp 112, the power source 82 can be reduced in size and cost.

As mentioned above, the image forming operation and the image projecting operation can be performed in sequence. Alternatively, the start/stop switch and the lamp switch may be turned on one at a time.

According to the arrangement of the present invention, if the amount of consumed electric power is larger than that during the image forming operation, the power source may be as large as required only by the lamp.

Since the amount of heat of the entire apparatus is small, reliability and safety can be achieved.

Figure 2:
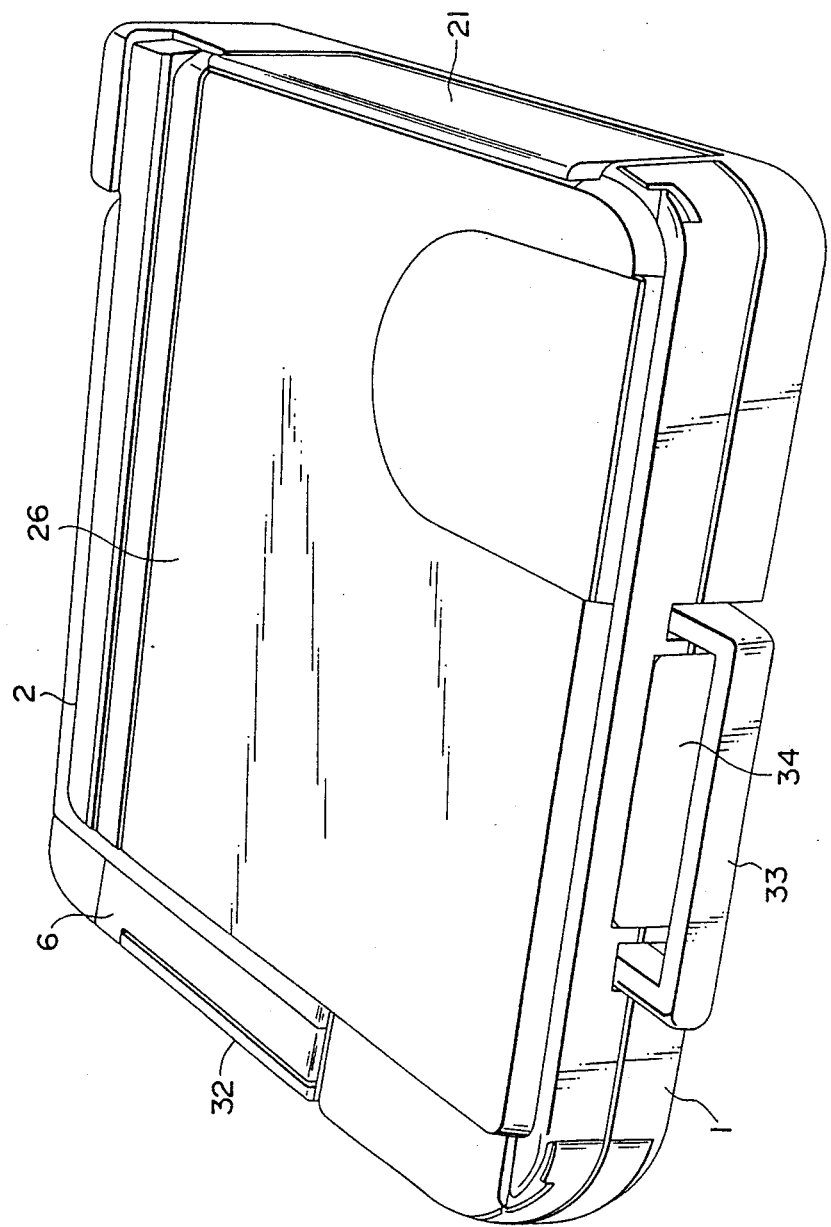
FIG. 2 is a perspective view of the apparatus with various parts or units accomodated in their predetermined positions.

Furthermore, as shown in FIG. 4, the magnet 66 is mounted on the free end of the paper supply tray 21, and the magnet 67 is mounted on one end of the original cover 26. When the support table 2 is moved onto the focusing plate 5 and the paper supply tray 21 is closed as shown in FIG. 2, the two magnets 66, 67 attract each other to thereby join the rightward end of the original cover 26 and the free end of the paper supply tray 21. Therefore the paper supply tray 21 can be prevented from being accidentally opened, and the original cover 26 also can be prevented from being accidentally opened. Further, the support table 2 can be prevented from being moved.

When the magnets two 66, 67 on the paper supply tray 21 and the original cover 26 are pulled apart from each other, the paper supply tray 21, the original cover 23 and the support table can be all released concurrently.

As shown in FIGS. 13(A) and 13(B), partly since the support table 2 is locked by the action of the two magnets 66, 67, and partly since the support table 2 can be locked by the locking pin 62 as the pivotal handle 33 is pulled to assume a raised position (FIG. 13(B)), stable locking of the support table 2 can be achieved.

Figure 25:
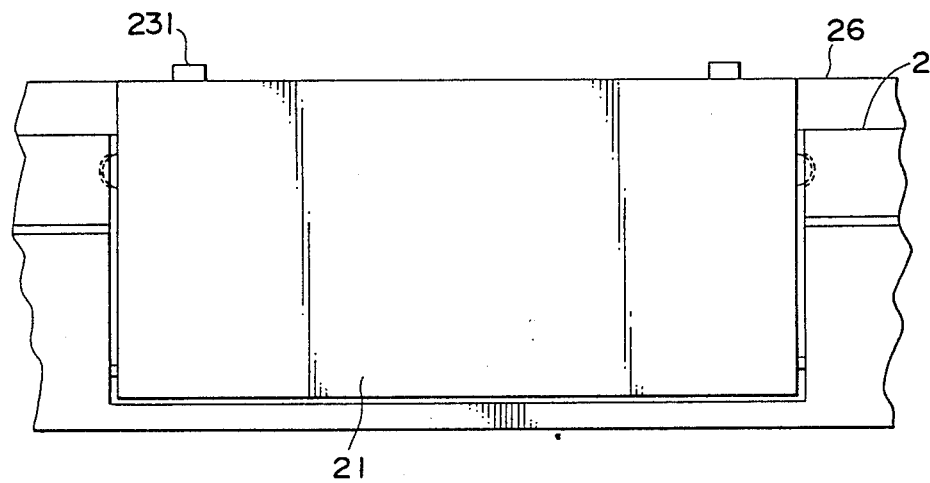
Figure 26:
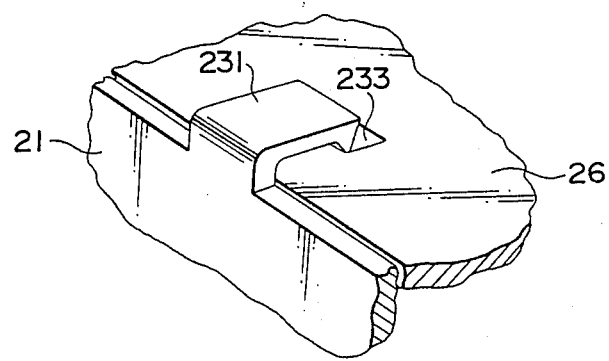

FIGS. 25 and 26 illustrate a fifth embodiment, in which the upper end of the paper supply tray 21 is provided with a hook 231, and the original cover 26 is provided with a locking hole 233 receptive of the hook 231. Thus the paper supply tray 21 and the support table 2 can be locked in position.

The fastening mechanism for the the paper supply tray 21 and the support table 2 may be a hook-and-eye fastener, a buckle, a surface-type (Velcro-type) fastener, or the like.

In the above mentioned embodiment, the movement of the support table 2 is prevented by the pivotal movement of the handle 33. Alternatively, as shown in FIG. 27, the operation panel 34 may be pivotable, and in response to the pivotal movement of the operation panel 34, the movement of the support table 2 may be prevented. Specifically, a U-shaped hook 501 is pivotally mounted on the upper end of the operation panel 34, and the support table 2 is provided with a locking hole 503 receptive of the hook 501. As its curved portion is pushed by the upper end of the operation panel 34, the hook 501 is angularly moved until its one end is engaged in the locking hole 503, thereby preventing the movement of the support table 2. The hook 501 is normally urged by a spring (not shown) away from the locking hole 503.

When projecting or copying, the operation panel 34 must mandatory be opened; that is, projecting or copying cannot be performed until the operation panel 34 is released to open.

Figure 17:
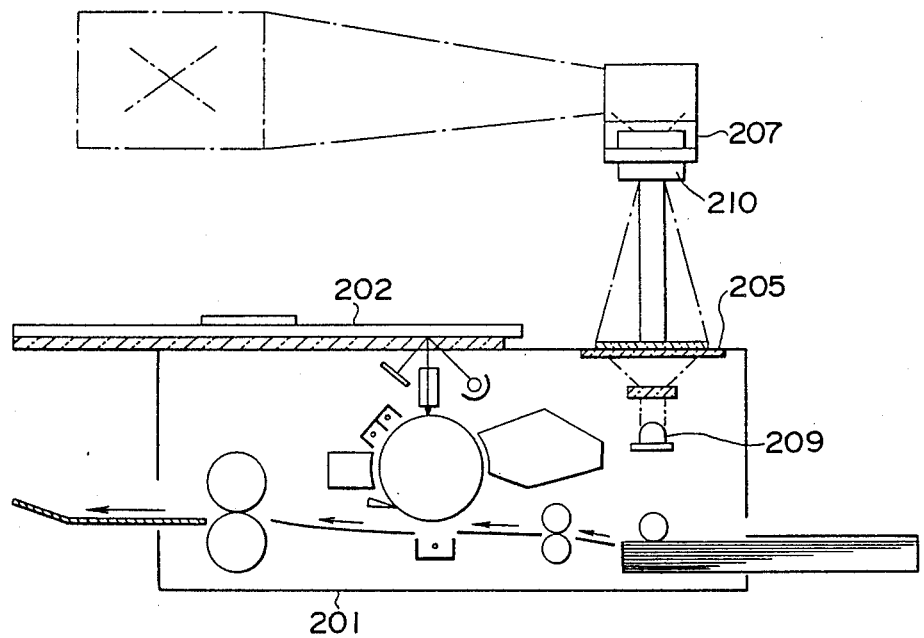
FIG. 17 is a schematic cross-sectional view of another prior art apparatus.

In FIG. 17, the original cover 26 is prevented from opening by means of a set of an iron plate 507 and a magnet 509. By the action of the iron plate 507 and the magnet 509, the transparent plate 24 and the original cover 26 are attracted toward each other.

In the illustrated embodiment, the paper inlet and outlet ports A, B are disposed on one and the same end of the body 1. Alternatively, the paper may be supplied from one side of the body 1 and may be discharged from the other end of the body 1.

In this case, a paper supply tray is provided at the paper inlet port A, and a paper discharge tray is provided at the paper outlet. The support table 2 is locked by the pivotal movement of at least one of these two trays.

If a cover is pivotally mounted on a front side of the body 1 for releasing any jam of paper, the support table 2 may be locked by this cover.

In the illustrated embodiment, the image processing apparatus is equipped with an overhead projector. However, the present invention is not limited to such embodiments, but may be adopted to a portable copying machine, a facsimile, an image reader, etc. without having the projecting function.

With the apparatus according to the fourth embodiment, partly because a pivotable member is mounted on one side of the body 1, and partly because the support table and the pivotable member are connected together and separated away from one another by a joining means, it requires no special mechanism only for restricting the movement of the support table.

As shown in FIG. 14(A), after the apparatus is powered (step 300), the operations of the operation panel 34 cannot be performed until the projecting unit 6 is in an operative position (step 303) or in an accomodated position (step 313). Therefore it is possible to prevent the lamp 112 from lighting on, and also to prevent copying operation.

With the projecting unit 6 in an operative postion (step 303) or in an accomodated position (step 313), if the switch S8 (step 334) is off when supplying a paper, or if the switch S9 (step 336) is off when supplying a paper, it is an error (step 311). During the copying operation, if the switch S9 (step 349) and the switch S8 (step 350) are off, copying operation is stopped (step 336). Therefore, as long as the projecting unit 6 is disposed between the operative position and the accomodated position, copying operation cannot be performed so that the support table driven by a motor 90 is prevented from coming into collision with the projecting unit 6.

After the operation panel 34 is operated as shown in FIG. 14(B), the lamp 112 is turned on (step 322) only when at step 319 the switch S8 is on (projecting unit 6 is in an operative position). While the lamp 112 is on, if the switch S8 (step 334) is switched off, the lamp 112 is turned off (step 361). Therefore the projecting unit 6 cannot be accomodated unless the lamp 112 is turned on, guaranteeing safety.

While the arm 7 is pivotally moved between the operative position and the accomodated position under and against the bias of the spring 41, the arm 7 receives a load (friction). Therefore the projecting unit 6 is prevented from being laid flat either if the arm 7 is disposed between the operative position and the accomodated position or if hand is released from arm 7, thus preventing the support table 2 from being broken or damaged by mistake.

In the illustrated embodiment, if the lamp 112 is on at step 340 of FIG. 14 (D) and it returns to step 327 of FIG. (A), copying operation is not started, even if the copy start/stop switch B4 is depressed, until the lamp 112 is turn off as the lamp switch B3 is depressed. Alternatively, if the copy start/stop switch B4 is depressed when the lamp 112 is on at step 340, the lamp 112 may be turned off and copying operation may start.

The arm 7 deviates from the correct operative position due to the wear at the pivotal portion. This deviation often causes the reflected light from the reflection-type focusing plate 4 not to strike the projecting lens 111; this reflected light focused about the projecting lens 111, creating heat to intense enough to cause burn, which is very dangerous.

FIGS. 28 through 34 illustrate a fine adjusting mechanism for adjusting the operative position of the arm 7.

Figure 28:
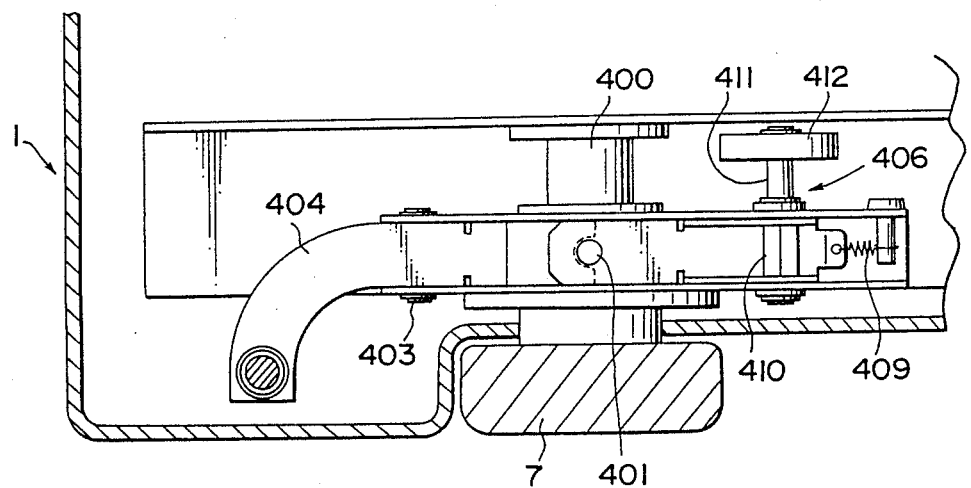

As shown in FIG. 28, on a rotary shaft 400 of the arm 7, a positioning pin 401, and a shield plate 402 for shielding photointerrupters provided on the switches S8, S9 are attached.

A lever 404 is mounted on a rotary shaft 400 and is pivotally movable about a shaft 403. The lever 404, as shown in FIG. 34, has in its one end a recess 405 opposing the pin 401.

Figure 29:
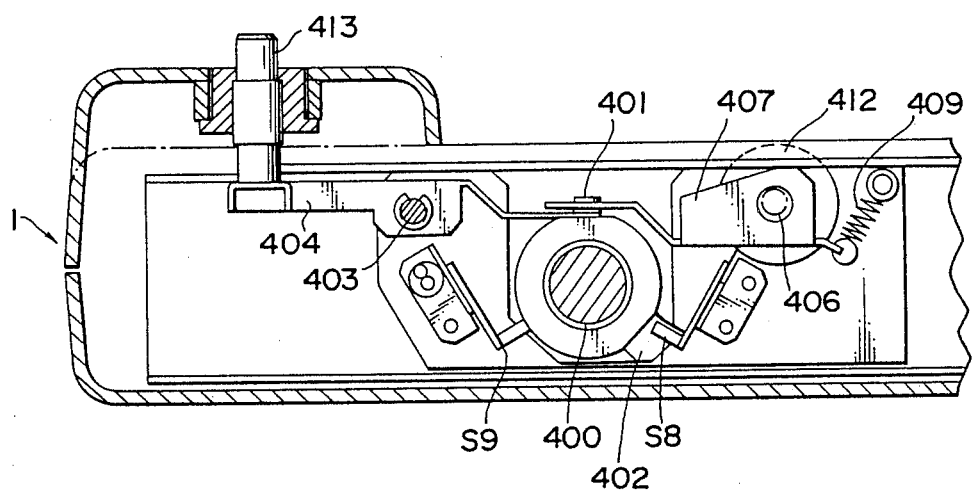
Figure 30:
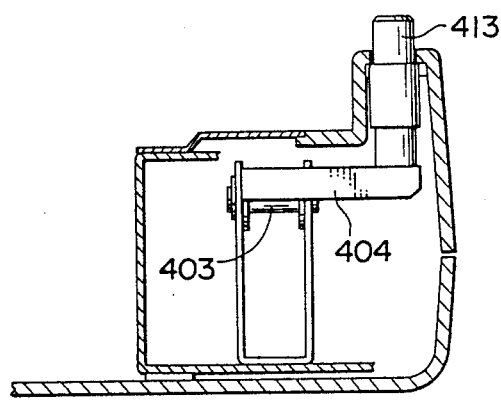
Figure 31:
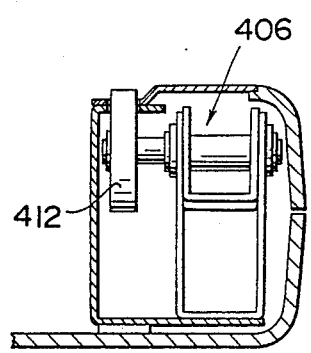

As shown in FIGS. 29 and 30, the lever 404 supports on the other end a button 413. As the button 413 is depressed, the lever 404 is pivotally moved about the shaft 403.

Figure 32:
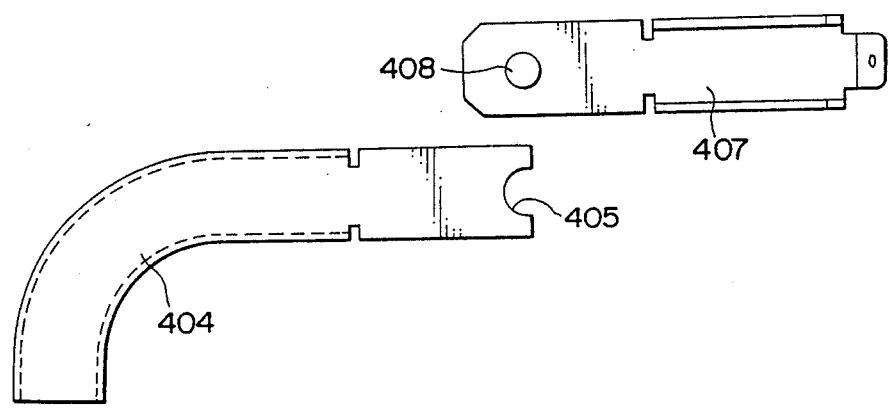

Another lever 407 is supported by a shaft 406. The lever 407, as shown in FIG. 32, has in its one end, a hole 4 engageable with the pin 401, the other end of the lever 407 being biased by a spring 409.

Figure 33:
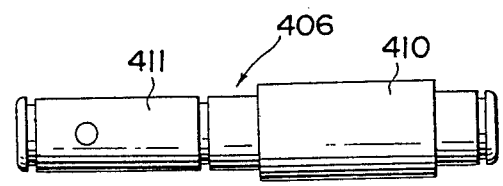
Figure 34:
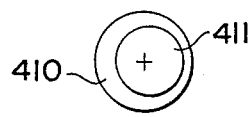

The shaft 406, as shown in FIG. 33, is composed of a first shaft member 410 and a second shaft member 411, the second shaft 411 being eccentric to the first shaft 410, as shown in FIG. 34. To the first shaft member 410, the lever 407 is pivotally connected; to the second shaft member 411, a handle 412 for turning the shaft 406 to adjust the operative position of the projecting unit 6.

With this arrangement, as the arm 7 is pivotally moved from the accomodated position to the operative position, the positioning pin 401 is moved so as to raise the lever 407. Then as the pin 401 comes in engagement with the hole 408, the projecting unit 6 is set in the operative position. Further, to return the arm 7 to the accomodated position, the button 413 is depressed to pivotally move the lever 404 so that the distal end of the lever 404 brings the hole 408 of the lever 407 out of engagement with the pin 401. Then the arm 7 is pivotally moved to the accomodated position.

For fine adjustment of the operative position, the handle 412 is pivotally moved. Since the second shaft member 411 to which the handle 412 is attached is eccentric to the first shaft member 410 on which the lever 407 is supported, the lever 407 is moved horizontally in FIG. 29 under the bias of the spring 409 in response to the pivotal movement of the handle 412. Thereby the position of the hole 408 is moved to vary the angle of pivotal movement of the pin 401 in engagement with the hole 408. As a result, the relative positions of the pin 401 and the hole 408 are shifted so as to make a fine adjustment of the operative position.

It will be understood that various change in the details, material, and arrangements of parts, which have been herein described and illustrated in order to explain the nature of the invention, may be made by those skilled in the art within the principle and scope of the invention as recited in the appended claims.

What is claimed is:

1. An image processing apparatus comprising:
   (a) an input unit for inputting an image of an initial original;
   (b) a support table on which the initial original is to be set, said support table being movably mounted along said input unit;
   (c) a reflection-type focusing plate on which a projecting sheet is to be set, said reflection type focusing plate being disposed alongside said input unit;
   (d) an image forming unit disposed under said reflection-type focusing plate for forming on a sheet an image inputted from said input unit; and
   (e) a projecting unit disposed above said reflection-type focusing plate for projecting an image of the projecting sheet set on said reflection-type focusing plate.

2. An image processing apparatus according to claim 1, wherein said image forming unit has a roll-paper setting portion and a manual paper-supplying portion.

3. An image processing apparatus according to claim 1, wherein said projecting unit is accomodatable under said support table so that said support table is movable.

4. An image processing apparatus according to claim 3, wherein said image forming unit has paper inlet and outlet ports, said projecting unit being accomodatable in such a position as not to cross a travelling path of the sheet in said image forming unit.

5. An image processing apparatus according to claim 1, wherein said image forming unit is adapted for forming on the sheet an image of the initial original on said support table on a reduced scale, said reflection-type focusing plate smaller in area than a original setting portion of said support table, said projecting unit being adapted for projecting on an enlarged scale the image of the projecting sheet set on said reflection-type focusing plate.

6. An image processing apparatus according to claim 1, further comprising:

(a) a power source for supplying electric power to said image forming unit and said projecting unit;

(b) switching means electrically arranged between said power source and said image forming and projecting units for switching the supply of electric power selectively to said image forming unit or said projecting unit;

(c) demanding means for demanding said image forming unit and said projecting unit to be operative; and (d) control means for controlling the supply of electric power selectively to said image forming unit and said projecting unit by controlling the switching means based on demand of said demanding means, thereby preventing said image forming unit and said projecting unit from being concurrently operated.

7. An image processing apparatus according to claim 6, wherein said power source has a capacity smaller than the sum of an amount of electric power consumed by said image forming unit and an amount of electric power consumed by said projecting unit.

8. An image processing apparatus according to claim 1, further comprising:

(a) a body on which said support table is supported;

(b) a pivotable member pivotally supported on one side of said body; and (c) connecting means for connecting said support table and said pivotable member together and for separating the same, thereby preventing said support table from moving when said support table is connected with said pivotable member 9. An image processing apparatus according to claim 8, wherein said support table has an original setting surface on which the original is to be set, and an original cover openable for covering the original set on said original setting surface, said connecting means being adapted for connecting said original cover and said pivotable member together and for separating the same.

10. An image processing apparatus according to claim 8, wherein said pivotable member is pivotally movable at least between a first position and a second position, said pivotable member serving as a handle to be gripped as connected with the support table in said first position when carrying said apparatus, said connecting means including locking means which is operable, in response to the pivotal movement of said handle, to release said handle out of engagement with the support table in said second position.

11. An image processing apparatus according to claim 8, wherein said pivotable member is pivotally movable at least between a first position and a second position, said pivotable member serving as an operating unit which is operative in said first position, said connecting means including locking means which is operable, in response to the pivotal movement of said operating unit, to bring said operating unit in engagement with said support table in said second position and to release said operating unit out of engagement with said support table in said first position.

12. An image processing apparatus comprising:

(a) a movable support table on which an initial original is to be supported;

(b) an image forming unit for forming on a sheet an image of the initial original supported on said support table;

(c) a reflection-type focusing plate on which a projecting sheet OHF is to be supported;

(d) a projecting unit, movable between an operative position and an, accomodated position, for projecting an image of the projecting sheet supported on said reflection-type focusing plate in said operative position;

(e) detecting means for detecting whether said projecting unit is in said operative position or said accomodated position; and (f) control means which renders said image forming unit or said projecting unit operative when said detecting means detects that said projecting unit is in said operative position, and which renders said image forming unit operative and said projecting unit inoperative when said detecting means detects that said projecting unit is in said accomodated position.

13. An image processing apparatus according to claim 12, wherein said projecting unit is pivotally supported on a body of said apparatus by an arm to which a friction member is attached at a pivot portion thereof so as to give a friction to said pivot portion.

14. An image processing apparatus according to claim 12, wherein said projecting unit is supported by an arm pivotally movable about a shaft between said accomodated position and said operative position, said apparatus further including an adjusting mechanism attached to said shaft for correcting any deviation of said arm from said operative position when said arm is pivotally moved to said operative position.

* * * * *